(12) United States Patent
Fischer et al.

(10) Patent No.: US 11,134,361 B2
(45) Date of Patent: Sep. 28, 2021

(54) SYSTEMS AND ARCHITECTURES FOR SUPPORT OF HIGH-PERFORMANCE LOCATION IN A NEXT GENERATION RADIO ACCESS NETWORK

(71) Applicant: QUALCOMM Incorporated, San Diego, CA (US)

(72) Inventors: Sven Fischer, Nuremberg (DE); Stephen William Edge, Escondido, CA (US); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/790,705

(22) Filed: Feb. 13, 2020

(65) Prior Publication Data

US 2020/0267508 A1 Aug. 20, 2020

Related U.S. Application Data

(60) Provisional application No. 62/805,945, filed on Feb. 14, 2019, provisional application No. 62/826,789, (Continued)

(51) Int. Cl.
*H04W 24/00* (2009.01)
*H04W 4/029* (2018.01)
*H04W 4/20* (2018.01)

(52) U.S. Cl.
CPC ............ *H04W 4/029* (2018.02); *H04W 4/20* (2013.01)

(58) Field of Classification Search
CPC ................................ H04W 4/029; H04W 4/20
(Continued)

(56) References Cited

U.S. PATENT DOCUMENTS 9,078,145 B2 7/2015 Issakov et al.
2008/0009243 A1 1/2008 Hart
(Continued)

FOREIGN PATENT DOCUMENTS

WO 2015192113 A1 12/2015
WO WO-2015192113 A1 12/2015
(Continued)

OTHER PUBLICATIONS

"3rd Generation Partnership Project, Technical Specification Group Radio Access Network, NG-RAN, Architecture Description (Release 15)", 3GPP Draft, Draft 38401-F40, 3rd Generation Partnership Project (3GPP), Mobile Competence Centre, 650, Route Des Lucioles, F-06921 Sophia-Antipolis Cedex, France, Jan. 3, 2019 (Jan. 3, 2019), XP051576896, 40 pages, Retrieved from the Internet: URL: http://www.3gpp.org/ftp/tsg%5Fran/WG3%5Flu/Draft%5FSpecs/TSG%2DRAN82/Draft%5F38401%2Df40%2Ezip. [retrieved on Jan. 3, 2019] p. 7, section 3.1; p. 10, section 6.1.1; p. 16, section 8.2.1.1.
(Continued)

*Primary Examiner* — Marcos Batista
(74) *Attorney, Agent, or Firm* — Thien T. Nguyen

(57) ABSTRACT

A Location Management Component (LMC) may be included in a gNB and connected to a gNB Central Unit (gNB-CU). The gNB-CU receives location related messages from any of (i) a UE via a gNB Distributed Units (gNB-DU), (ii) another gNB via an Xn interface, or (iii) a core network entity (e.g. AMF) via an NG interface. These messages can be transported in container messages (e.g., an RRC container for LPP messages sent to or received from a UE; an NGAP container for messages sent to or received from an AMF, or an XnAP container for messages sent to or received from another gNB). The gNB-CU removes the location related messages from the container messages and forwards them to an LMC using F1-AP container messages. Location
(Continued)

related messages sent from an LMC to other entities are transported in a reverse manner through a gNB-CU using corresponding container messages.

30 Claims, 11 Drawing Sheets

Related U.S. Application Data filed on Mar. 29, 2019, provisional application No. 62/886,829, filed on Aug. 14, 2019, provisional application No. 62/887,526, filed on Aug. 15, 2019.

(58) Field of Classification Search
USPC .......................... 455/456.1–456.3; 370/338
See application file for complete search history.

(56) References Cited

U.S. PATENT DOCUMENTS

| | | |
|---|---|---|
| 2012/0258733 A1 | 10/2012 | Fischer et al. |
| 2014/0016621 A1 | 1/2014 | Zhang et al. |
| 2015/0296359 A1 | 10/2015 | Edge |
| 2015/0365790 A1 | 12/2015 | Edge et al. |
| 2017/0201926 A1 | 7/2017 | Krendzel et al. |
| 2017/0230149 A1 | 8/2017 | Wang et al. |
| 2018/0098314 A1 | 4/2018 | Rico Alvarino et al. |
| 2019/0014561 A1 | 1/2019 | Takeda et al. |
| 2019/0037338 A1 | 1/2019 | Edge et al. |
| 2019/0090092 A1 | 3/2019 | Hwang et al. |
| 2019/0380056 A1 | 12/2019 | Lee et al. |
| 2020/0137715 A1 | 4/2020 | Edge et al. |
| 2020/0154240 A1 | 5/2020 | Edge et al. |
| 2021/0099253 A1 | 4/2021 | Kim et al. |
| 2021/0099256 A1 | 4/2021 | Lee et al. |
| 2021/0135792 A1 | 5/2021 | Cho et al. |

FOREIGN PATENT DOCUMENTS

| | | | | |
|---|---|---|---|---|
| WO | WO-2017196510 A1 | 11/2017 | | |
| WO | WO-2019027540 A1 | 2/2019 | | |
| WO | WO-2020073644 A1 * | 4/2020 | ............ | H04W 64/00 |
| WO | WO-2020097441 A1 | 5/2020 | | |

OTHER PUBLICATIONS

International Search Report and Written Opinion—PCT/US2020/018261—ISA/EPO—dated May 15, 2020.
Qualcomm Incorporated: "Local NR Positioning in NG-RAN", 3GPP Draft, 3GPP TSG-RAN WG3 Meeting #105, R3-193586 (Local LMF), 3rd Generation Partnership Project (3GPP), Mobile Competence Centre, 650, Route Des Lucioles, F-06921 Sophia-Antipolis Cedex, France, vol. RAN WG3, No. Ljubljana, Slovenia, Aug. 26, 2019-Aug. 30, 2019, Aug. 16, 2019 (Aug. 16, 2019), XP051769793, 32 pages, Retrieved from the Internet: URL: http://www.3gpp.org/ftp/tsg_ran/WG3_Iu/TSGR3_105/Docs/R3-193586.zip. [retrieved on Aug. 16, 2019] the whole document.
Qualcomm Incorporated: "NG-RAN Positioning Architecture and Procedures", 3GPP Draft, 3GPP TSG-RAN WG2 Meeting #105, R2-1901370, (NG-RAN Positioning Architecture), 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051602729, 10 pages, Retrieved from the Internet: URL: http://www.3gpp.org/ftp/tsg%5Fran/WG2%5FRL2/TSGR2%5F105/Docs/R2%2D1901370%2Ezip. [retrieved on Feb. 15, 2019] the whole document.
Qualcomm Incorporated: "NG-RAN Positioning Architecture and Procedures", 3GPP Draft, R2-1817898, (NG-RAN Positioning Architecture), 3rd Generation Partnership Project (3GPP), Mobile Competence Centre, 650, Route Des Lucioles, F-06921 Sophia-Antipolis Cedex, France, vol. RAN WG2. No. Spokane, USA, Nov. 12, 2018-Nov. 16, 2018, Nov. 12, 2018 (Nov. 12, 2018), XP051557411, 17 pages, Retrieved from the Internet: URL: http://www.3gpp.org/ftp/Meetings%5F3GPP%5FSYNC/RAN2/Docs/R2%2D1817898%2Ezip. [retrieved on Nov. 12, 2018] paragraph [09.2]-paragraph [9.3.x.7.2].
Qualcomm Incorporated: "Combined Downlink and Uplink NR Positioning Procedures", 3GPP Draft, 3GPP TSG-RAN WG2 Meeting #82, R2-1817899, (Positioning Procedures), 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 2, 2018 (Nov. 2, 2018), XP051481785, pp. 1-18, Retrieved from the Internet: URL: https://www.3gpp.org/ftp/tsg_ran/wg2_rl2/TSGR2_104/Docs/R2-1817899.zip [retrieved on Nov. 2, 2018], Paragraphs [001]-[004], p. 4, Figures 1-5.
Qualcomm Incorporated: "On Demand Transmission of PRS for NR," 3GPP Draft, 3GPP TSG-RAN WG2 Meeting #104, R2-1817902_ (On Demand PRS), 3rd Generation Partnership Project (3GPP), Mobile Competence Centre, 650, Route Des Lucioles, F-06921, Sophia-Antipolis Cedex, France, vol. RAN WG2. No, Spokane. USA, Nov. 12, 2018-Nov. 16, 2018, Nov. 12, 2018 (Nov. 12, 2018), XP051557415, 27 pages, Retrieved from the Internet: URL: http://www.3gpp.org/ftp/Meetings%5F3GPP%5FSYNC/RAN2/Docs/R2%2D1817902%2Ezip[retrieved on Nov. 12, 2018], the whole document, in combination with US20180217224A1, Sections 9.2.x.3 and 9.2.x.6;figures 9.2.x.3-1,9.2.x.6-1.
Trueposition: "UTDOA Architecture Options", 3GPP Draft, R2-112792, UTDOA Architecture, 3rd Generation Partnership Project (3GPP), Mobile Competence Centre, 650, Route Des Lucioles, F-06921 Sophia-Antipolis Cedex, France, vol. RAN WG2, No. Barcelona, Spain, May 9, 2011, May 3, 2011 (May 3, 2011), XP05095236, 9 pages, [retrieved on May 3, 2011] the whole document.

* cited by examiner

# SYSTEMS AND ARCHITECTURES FOR SUPPORT OF HIGH-PERFORMANCE LOCATION IN A NEXT GENERATION RADIO ACCESS NETWORK

CROSS-REFERENCE TO RELATED APPLICATIONS

This application claims the benefit of U.S. Provisional Application Nos. 62/805,945, entitled "ARCHITECTURE FOR SUPPORT OF HIGH-PERFORMANCE LOCATION SERVICES IN A NEXT GENERATION RADIO ACCESS NETWORK," filed Feb. 14, 2019, 62/826,789, entitled "ARCHITECTURE FOR SUPPORT OF HIGH-PERFORMANCE LOCATION SERVICES IN A NEXT GENERATION RADIO ACCESS NETWORK," filed Mar. 29, 2019, 62/886,829, entitled "HANDOVER OF 5G LOCATION SESSIONS FOR AN NG-RAN LOCATION MANAGEMENT COMPONENT," filed Aug. 14, 2019, and 62/887,526, entitled "ARCHITECTURE FOR SUPPORT OF HIGH-PERFORMANCE LOCATION SERVICES IN A NEXT GENERATION RADIO ACCESS NETWORK," filed Aug. 15, 2019, which are assigned to the assignee thereof and which are expressly incorporated herein by reference in their entireties.

BACKGROUND

Field of the Disclosure

Aspects of the disclosure relate to systems and architectures to support location services in a 5G Next Generation Radio Access Network (NG-RAN).

Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor.

Obtaining the location of a mobile device that is accessing a wireless (e.g. 5G) network may be useful for many applications including, for example, emergency calls, personal navigation, asset tracking, managing the movement of objects and tools in a factory or warehouse, locating a friend or family member, etc. However, expectations for location support for larger numbers of mobile devices with higher levels of accuracy and lower levels of latency may have the effect of increasing the cost and complexity of wireless networks or making the higher accuracy and lower latency more difficult to attain (e.g. when cost is restricted). It may therefore be desirable to improve the systems and architectures used for support of location services to enable higher accuracy and lower latency for large numbers of mobile devices to coexist with limited cost and complexity.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A Location Management Component (LMC) may be included in a gNB and connected to a gNB Central Unit (gNB-CU). The gNB-CU receives location related messages from any of (i) a UE via a gNB Distributed Units (gNB-DU), (ii) another gNB via an Xn interface, or (iii) a core network entity (e.g. AMF) via an NG interface. These messages can be transported in container messages (e.g., an RRC container for LPP messages sent to or received from a UE; an NGAP container for messages sent to or received from an AMF, or an XnAP container for messages sent to or received from another gNB). The gNB-CU removes the location related messages from the container messages and forwards them to an LMC using F1-AP container messages. Location related messages sent from an LMC to other entities are transported in a reverse manner through a gNB-CU using corresponding container messages.

In one implementation, a method for supporting positioning of a user equipment (UE) performed by a Next Generation Radio Access Network (NG-RAN) node in a radio access network (RAN), the NG-RAN node comprising a Central Unit (CU) configured to communicate with one or more other NG-RAN nodes within the RAN and with a core network node, a Location Management Component (LMC) configured to communicate with the CU to support the positioning of the UE, and a Distributed Unit (DU) configured to communicate with the UE, includes exchanging a first plurality of positioning messages between the LMC and the UE via the CU and DU; exchanging a second plurality of positioning messages between the LMC and the one or more other NG-RAN nodes via the CU; and exchanging a third plurality of positioning messages between the LMC and the core network node via the CU.

In one implementation, a Next Generation Radio Access Network (NG-RAN) node in a radio access network (RAN) configured to support positioning of a user equipment (UE), the NG-RAN node comprising a Central Unit (CU) configured to communicate with one or more other NG-RAN nodes within the RAN and with a core network node, a Location Management Component (LMC) configured to communicate with the CU to support the positioning of the UE, and a Distributed Unit (DU) configured to communicate with the UE, includes at least one external interface configured to communicate with external entities; at least one internal interface configured to communicate between the LMC, the CU, and the DU; at least one memory; at least one processor coupled to the at least one external interface, the at least one internal interface, and the at least one memory and configured to: exchange a first plurality of positioning messages between the LMC and the UE via the CU and DU; exchange a second plurality of positioning messages between the LMC and the one or more other NG-RAN nodes via the CU; and exchange a third plurality of positioning messages between the LMC and the core network node via the CU.

In one implementation, a Next Generation Radio Access Network (NG-RAN) node in a radio access network (RAN) configured to support positioning of a user equipment (UE), the NG-RAN node comprising a Central Unit (CU) configured to communicate with one or more other NG-RAN nodes within the RAN and with a core network node, a Location Management Component (LMC) configured to communicate with the CU to support the positioning of the UE, and a Distributed Unit (DU) configured to communicate with the UE, includes means for exchanging a first plurality of positioning messages between the LMC and the UE via the CU and DU; means for exchanging a second plurality of positioning messages between the LMC and the one or more other NG-RAN nodes via the CU; and means for exchanging a third plurality of positioning messages between the LMC and the core network node via the CU.

In one implementation, a non-transitory storage medium including program code stored thereon, the program code is operable to cause at least one processor in a Next Generation Radio Access Network (NG-RAN) node in a radio access network (RAN) to support positioning of a user equipment (UE), the NG-RAN node comprising a Central Unit (CU) configured to communicate with one or more other NG-RAN nodes within the RAN and with a core network node, a Location Management Component (LMC) configured to communicate with the CU to support the positioning of the UE, and a Distributed Unit (DU) configured to communicate with the UE, includes program code to exchange a first plurality of positioning messages between the LMC and the UE via the CU and DU; program code to exchange a second plurality of positioning messages between the LMC and the one or more other NG-RAN nodes via the CU; and program code to exchange a third plurality of positioning messages between the LMC and the core network node via the CU.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

Figure 1:
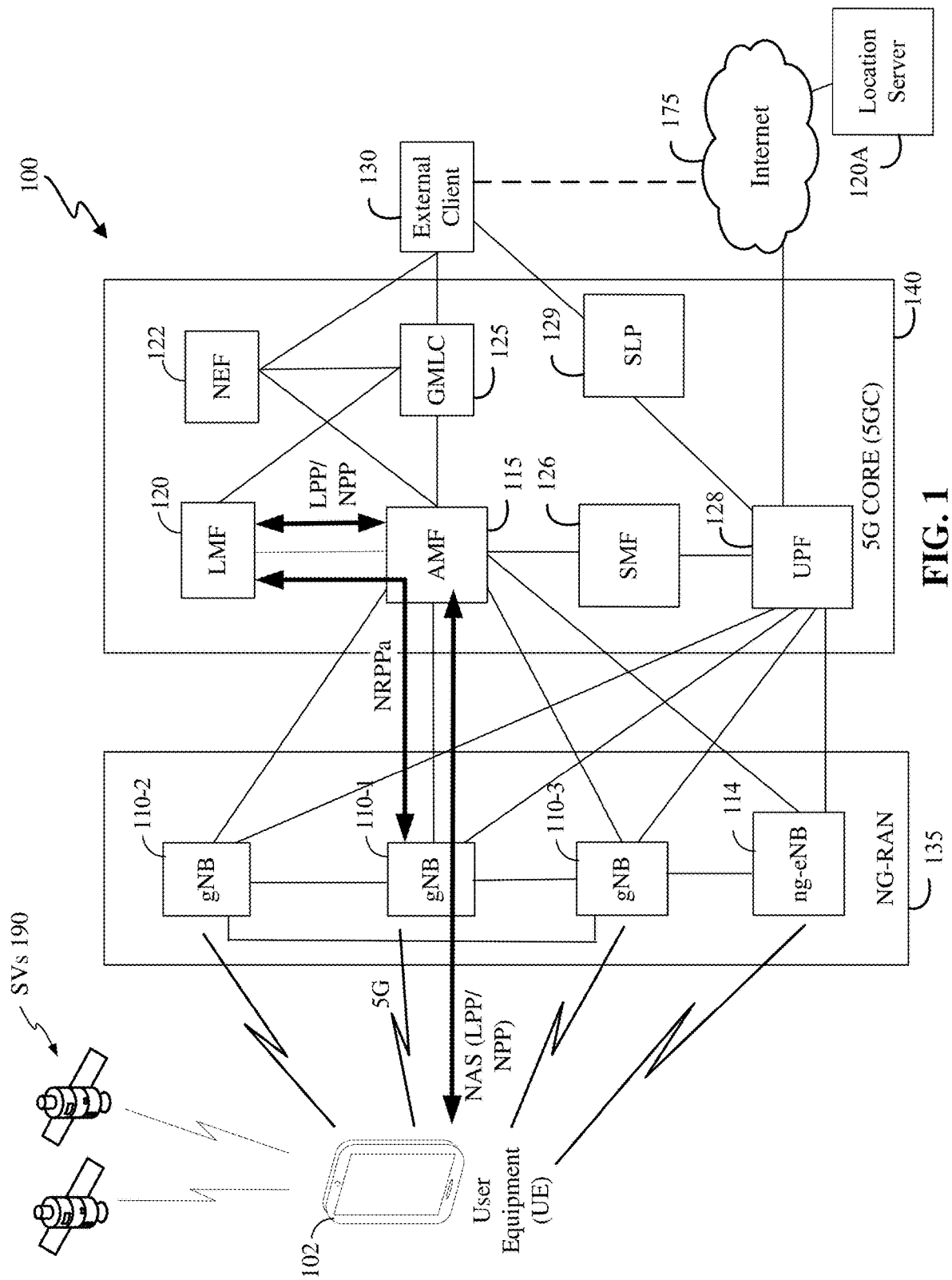
FIG. 1 illustrates a wireless communication system including a Next Generation (NG) Radio Access Network.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, 110-2, and 110-3 of a gNB are shown in FIG. 1. A reference to a gNB 110 then refers to any of gNBs 110-1, 110-2, and 110-3.

DETAILED DESCRIPTION

For locating a user equipment (UE) which is accessing a Fifth Generation (5G) wireless network, as defined by the Third Generation Partnership Project (3GPP), a location server (e.g. a Location Management Function (LMF)) can be located in a 5G Core Network (5GCN) and connected to an Access and Mobility Management Function (AMF). Location related signaling between an LMF and a target UE may comprise core network and Radio Access Network (RAN) signaling. For example, a Long Term Evolution Positioning Protocol (LPP) message between an LMF and UE may need to be transported over multiple interfaces, including interfaces between an LMF and AMF, between an AMF and NG-RAN node (e.g. a gNB) and over an air interface between am NG-RAN node (e.g. gNB) and the UE. These interfaces may be control plane interfaces, user plane interfaces or both. Each interface and intermediate node typically adds additional delay to the transport of the LPP message.

In order to reduce the signaling delays between a location server and a UE, portions of the location server function may be moved from the core network to the RAN. A location server function in the RAN may also increase location capacity by offloading location support from LMFs in the core network.

In accordance with an implementation, the RAN location server function (referred to here as a "Location Management Component" (LMC) or as a "local LMF") may be a separate component in a New Radio (NR) Node B (gNB) connected to a gNB Central Unit (CU), referred to as a gNB-CU. The gNB-CU may receive location related messages from the UE via a gNB Distributed Unit (gNB-DU), from another gNB-CU in a different gNB via an Xn interface between two gNBs, or from a core network entity, e.g., an AMF, via an NG interface. Location related signaling may be transported in container messages for application protocols supporting different interfaces. For example, the transport may use, a Radio Resource Control (RRC) container for LPP messages transported over the air (Uu) interface, a Next Generation Application Protocol (NGAP) container for location related messages transported over an NG interface between an AMF and a gNB (or other NG-RAN node), and an Xn Application Protocol (XnAP) container for location related messages transported over an Xn interface between two NG-RAN nodes, e.g., between two gNBs. A gNB-CU in a destination gNB may then forward each of these containers to an LMC in the gNB using an F1 Application Protocol (F1-AP) container message. Similarly, for location related messages sent from an LMC to a UE or to another gNB or to a core network entity, e.g., AMF, the LMC may send the location related message inside an F1AP message container to the gNB-CU for distribution to a UE, other gNB or core network entity.

The architectures and other aspects are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A mobile device, also referred to herein as a UE, may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 shows a diagram of a communication system 100, according to an embodiment. The communication system 100 may be configured for supporting positioning of a user equipment (UE) 102. Here, the communication system 100 comprises a UE 102, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 102 is illustrated, it will be understood that many UEs (e.g., hundreds, thousands, millions, etc.) may utilize the communication system 100. Similarly, the communication system 100 may include a larger (or smaller) number of SVs 190, gNBs 110, next generation evolved Node Bs (ng-eNBs) 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology or for other communication technologies and protocols) may be used to configure and support a location server function being included in the RAN.

The UE 102 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 102 may correspond to a cellphone, smartphone, laptop, tablet, PDA, tracking device, navigation device, Internet of Things (IoT) device, or some other portable or moveable device. Typically, though not necessarily, the UE 102 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 135 and 5GC 140), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (via elements of 5GC 140 not shown in FIG. 1, or possibly via a Gateway Mobile Location Center (GMLC) 125) and/or allow the external client 130 to receive location information regarding the UE 102 (e.g., via the GMLC 125).

The UE 102 may include a single entity or may include multiple entities such as in a personal area network where a user may employ audio, video and/or data I/O devices and/or body sensors and a separate wireline or wireless modem. An estimate of a location of the UE 102 may be referred to as a location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.) A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 comprise NR NodeBs, also referred to as gNBs, 110-1, 110-2 and 110-3 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 102 via wireless communication between the UE 102 and one or more of the gNBs 110, which may provide wireless communications access to the 5GC 140 on behalf of the UE 102 using 5G NR. 5G NR radio access may also be referred to as NR radio access or as 5G radio access and may be as defined by the Third Generation Partnership Project (3GPP). In FIG. 1, the serving gNB for UE 102 is assumed to be gNB 110-1, although other gNBs (e.g. gNB 110-2 and/or gNB 110-3) may act as a serving gNB if UE 102 moves to another location or may act as a secondary gNB to provide additional throughout and bandwidth to UE 102. A Location Management Component (LMC) within a node in the NG-RAN 135, such as in serving gNB 110-1, may perform a location server function, as discussed herein.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 102. Some gNBs 110 (e.g. gNB 110-2) and/or ng-eNB 114 in FIG. 1 may be configured to function as positioning-only beacons, which may transmit signals (e.g. PRS signals) and/or may broadcast assistance data to assist positioning of UE 102 but may not receive signals from UE 102 or from other UEs. It is noted that while only one ng-eNB 114 is shown in FIG. 1, some embodiments may include multiple ng-eNBs 114.

As noted, while FIG. 1 depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 102, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The methods and techniques described herein for support of a RAN location server function may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 102, including cell change and handover and may participate in supporting a signaling connection to the UE 102 and possibly data and voice bearers for the UE 102. The LMF 120 may support positioning of the UE 102 when UE accesses the NG-RAN 135 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), and/or other positioning procedures. The LMF 120 may also process location services requests for the UE 102, e.g., received from the AMF 115 or from the GMLC 125. The LMF 120 may be connected to AMF 115 and/or to GMLC 125. In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 102's location) may be performed at the UE 102 (e.g., using signal measurements obtained by UE 102 for signals transmitted by wireless nodes such as gNBs 110 and ng-eNB 114, and assistance data provided to the UE 102, e.g. by LMF 120).

The Gateway Mobile Location Center (GMLC) 125 may support a location request for the UE 102 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 102) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

A Network Exposure Function (NEF) 122 may be included in 5GC 140. The NEF 122 may support secure exposure of capabilities and events concerning 5GC 140 and UE 102 to an external client 130 and may enable secure provision of information from external client 130 to 5GC 140. In the context of location services, NEF 122 may function to obtain a current or last known location for a UE 102, may obtain an indication of a change in location for a UE 102, or an indication of when a UE 102 becomes available (or reachable). The NEF 122 may be connected to the GMLC 125 to support last known location, current location and/or deferred periodic and triggered location for the UE 102 by sending requests to and receiving responses from GMLC 125. NEF 122 may also or instead be connected to AMF 115 to support last known location, current location and/or deferred periodic and triggered location for the UE 102 by sending requests to and receiving responses from AMF 115.

A User Plane Function (UPF) 128 may support voice and data bearers for UE 102 and may enable UE 102 voice and data access to other networks such as the Internet 175. UPF 128 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 128 may be connected to a Secure User Plane Location (SUPL) Location Platform (SLP) 129 to enable support of positioning of UE 102 using SUPL. SLP 129 may be further connected to or accessible from external client 130.

As illustrated, a Session Management Function (SMF) 126 connects the AMF 115 and the UPF 128. The SMF 126 may have the capability to control both a local and a central UPF within a PDU session. SMF 126 may manage the establishment, modification and release of PDU sessions for UE 102, perform IP address allocation and management for UE 102, act as a Dynamic Host Configuration Protocol (DHCP) server for UE 102, and select and control a UPF 128 on behalf of UE 102.

The external client 130 may be connected to the core network 140 via the GMLC 125 and/or the SLP 129. The external client 130 may optionally be connected to the core network 140 and/or to a location server 120A, which may be, e.g., an SLP, that is external to 5GCN 140, via the Internet 175. The external client 130 may be a server, a web server, or a user device, such as a personal computer, a UE, etc.

As further illustrated in FIG. 1, the LMF 120 may communicate with the gNBs 110 and/or with the ng-eNB 114 using a New Radio Position Protocol A (NRPPa), which may be defined in 3GPP Technical Specification (TS) 38.455. NRPPa messages may be transferred between a gNB 110 and the LMF 120, and/or between an ng-eNB 114 and the LMF 120, via the AMF 115. As further illustrated in FIG. 1, LMF 120 and UE 102 may communicate using an LTE Positioning Protocol (LPP), which may be defined in 3GPP TS 36.355 or TS 37.355. LMF 120 and UE 102 may also or instead communicate using a New Radio Positioning Protocol (which may be referred to as NPP or NRPP), which may be the same as, similar to, or an extension of LPP. Here, LPP and/or NPP messages may be transferred between the UE 102 and the LMF 120 via the AMF 115 and a serving gNB 110-1 or serving ng-eNB 114 for UE 102. For example, LPP and/or NPP messages may be transferred between the LMF 120 and the AMF 115 using service operations based on the HyperText Transfer Protocol (HTTP) and may be transferred between the AMF 115 and the UE 102 using a 5G Non-Access Stratum (NAS) protocol. The LPP and/or NPP protocol may be used to support positioning of UE 102 using UE assisted and/or UE based position methods such as A-GNSS, RTK, OTDOA, angle of arrival (AOA), angle of departure (AOD), and/or ECID. The NRPPa protocol may be used to support positioning of UE 102 using network based position methods such as ECID (e.g. when used with measurements obtained by a gNB 110 or ng-eNB 114) and/or may be used by LMF 120 to obtain location related information from gNBs 110 and/or ng-eNB 114, such as parameters defining Positioning Reference Signal (PRS) transmission from gNBs 110 and/or ng-eNB 114.

With a UE assisted position method, UE 102 may obtain location measurements and send the measurements to a location server, e.g., LMF 120 or SLP 129) for computation of a location estimate for UE 102. For example, the location measurements may include one or more of a Received Signal Strength Indication (RSSI), Round Trip signal propagation Time (RTT) (which may also be referred to more simply as Round Trip Time), Reference Signal Time Difference (RSTD), Reference Signal Received Power (RSRP), Reference Signal Received Quality (RSRQ), AOA, and/or AOD for gNBs 110, ng-eNB 114 and/or a WLAN access point (AP). The location measurements may also or instead include measurements of GNSS pseudorange, code phase and/or carrier phase for SVs 190. With a UE based position method, UE 102 may obtain location measurements (e.g. which may be the same as or similar to location measurements for a UE assisted position method) and may compute a location of UE 102 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RS SI, RTT, RSRP, RSRQ, AOA or Time Of Arrival (TOA)) for signals transmitted by UE 102, and/or may receive measurements obtained by UE 102, and may send the measurements to a location server, e.g., LMF 120, for computation of a location estimate for UE 102.

Information provided by the gNBs 110 and/or ng-eNB 114 to the location server, e.g., LMF 120 using NRPPa or to an LMC within a node in the NG-RAN 135, such as in serving gNB 110-1 using XnAP, may include timing and configuration information for PRS transmission and location coordinates. The location server may then provide some or all of this information to the UE 102 as assistance data in an LPP and/or NPP message via the NG-RAN 135 and the 5GC 140.

An LPP or NPP message sent from the location server to the UE 102 may instruct the UE 102 to do any of a variety of things, depending on desired functionality. For example, the LPP or NPP message could contain an instruction for the UE 102 to obtain measurements for GNSS (or A-GNSS), WLAN, and/or OTDOA (or some other position method). In the case of OTDOA, the LPP or NPP message may instruct the UE 102 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 102 of a signal (e.g. a PRS signal) transmitted or broadcast by one gNB 110 and a similar signal transmitted by another gNB 110. The UE 102 may send the measurements back to the location server, e.g., to the LMF 120 in an LPP or NPP message (e.g. inside a 5G NAS message) via the serving gNB 110-1 (or serving ng-eNB 114) and the AMF 115 or to the LMC within a node in the NG-RAN 135, such as in serving gNB 110-1.

As noted, while the communication system 100 is described in relation to 5G technology, the communication system 100 may be implemented to support other communication technologies, such as GSM, WCDMA, LTE, etc., that are used for supporting and interacting with mobile devices such as the UE 102 (e.g., to implement voice, data, positioning, and other functionalities). In some such embodiments, the 5GC 140 may be configured to control different air interfaces. For example, in some embodiments, 5GC 140 may be connected to a WLAN, either directly or using a Non-3GPP InterWorking Function (N3IWF, not shown FIG. 1) in the 5GC 140. For example, the WLAN may support IEEE 802.11 WiFi access for UE 102 and may comprise one or more WiFi APs. Here, the N3IWF may connect to the WLAN and to other elements in the 5GC 140 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPA (LPPa, as defined in 3GPP TS 36.455) in place of NRPPa to send and receive location information to and from the eNBs in the E-UTRAN and may use LPP to support positioning of UE 102. In these other embodiments, a RAN location server function may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

Figure 2:
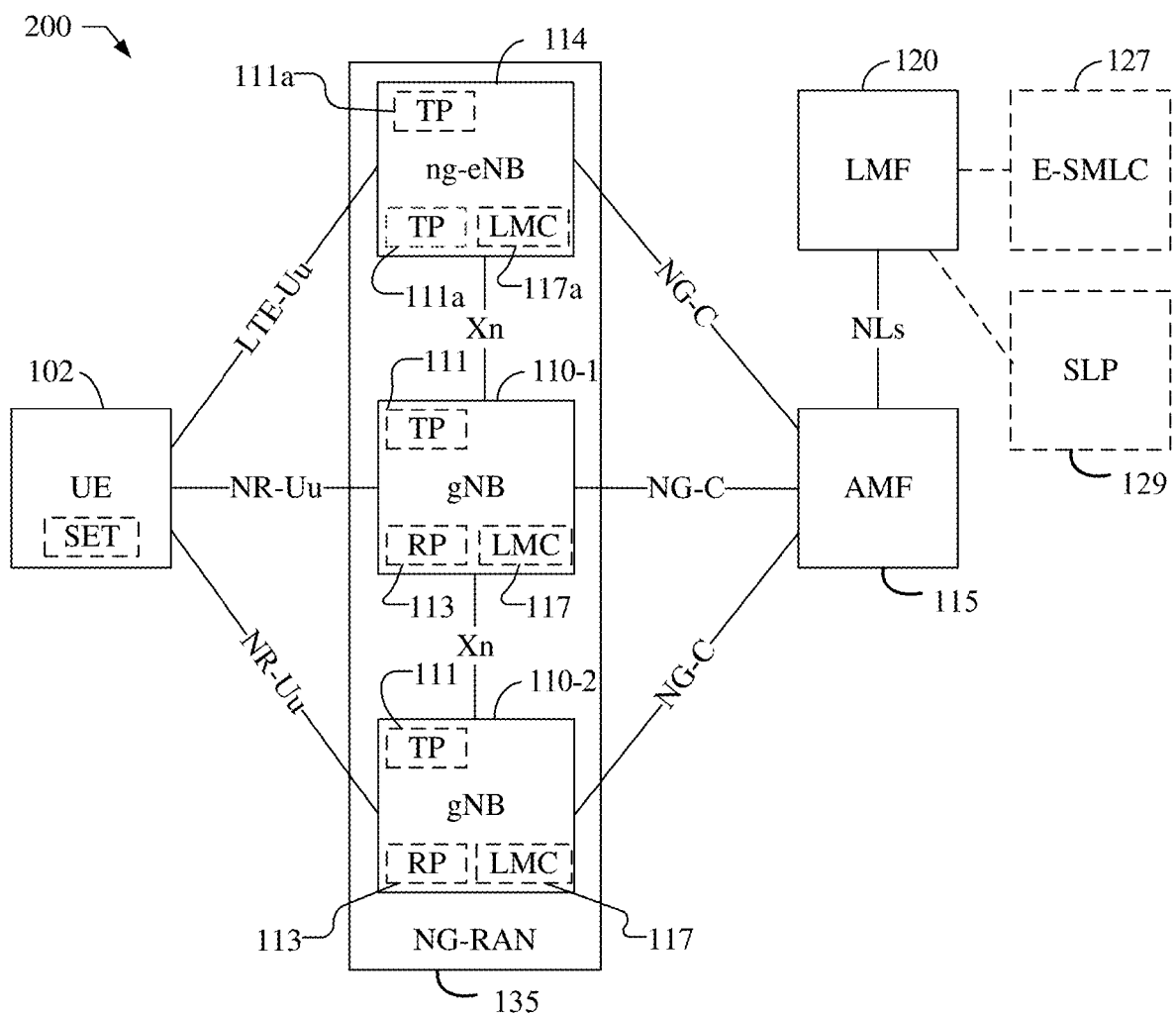
FIG. 2 illustrates a positioning architecture diagram for a communication system.

FIG. 2 shows a positioning architecture diagram applicable to communication system 100 in FIG. 1, according to an embodiment. The positioning architecture shown in FIG. 2 may be a subset of the architecture show in FIG. 1 that is applicable to NG-RAN 135, and shows additional elements in NG-RAN 135 not shown in FIG. 1, and may be used to support NR RAT dependent position methods. As illustrated, the LMF 120 may be in communication with an Enhanced Serving Mobile Location Center (E-SMLC) 127, e.g., which may be part of a separate EPC, and a Secure User Plane Location (SUPL) Location Platform (SLP) 129.

It should be noted that the gNBs 110 and ng-eNB 114 may not always both be present in the NG-RAN 135. Moreover, when both the gNBs 110 and ng-eNB 114 are present, the NG-C interface with the AMF 115 may only present for one of them.

As illustrated, a gNB 110 may be allowed to control one or more Transmission Points (TPs) 111, such as remote radio heads, or broadcast-only TPs for improved support of DL position methods such as OTDOA, AOD, RTT, or ECID. Additionally, a gNB 110 may be allowed to control one or more Reception Points (RPs) 113, such as remote radio heads or internal Location Measurement Units (LMUs) for UL measurements for position methods such as Uplink Time Difference of Arrival (UTDOA), AOA, RTT, or ECID. In some implementations, a TP 111 and RP 113 may be combined into a Transmission Reception Point (TRP) (not shown in FIG. 2), which performs the functions of both a TP 111 and an RP 113. ATP 111, RP 113, and/or a TRP may be part of or may comprise a Distributed Unit (DU, also referred to as gNB-DU) in a gNB 110, which manages UL and/or DL transmissions and reception for one or more cells according to 5G NR. Further, a gNB 110 may be allowed to include a Location Management Component (LMC) 117 (also referred to as a "local LMF"), which may be a location server (or location server function) enabled to support positioning of a target UE 102 in a serving gNB 110 or neighboring gNB 110 for UE 102. Positioning of a UE 102 by an LMC 117 in a serving or neighboring gNB 110 can be used to provide a location service to a UE 102, serving AMF 115 or LMF 120 and to improve NG-RAN operation, e.g., by assisting with handover and distribution of UEs among available NG-RAN nodes.

As illustrated, the ng-eNB 114 may control one or more TPs 111a and may include an LMC 117a, which may use different protocols than TPs 111 and LMC 117 in gNBs 110-1 and 110-2, e.g., the TPs 111a and LMC 117a may use protocols related to LTE, while TPs 111 and LMC 117 use protocols related to 5G NR. The TPs 111a and LMC 117a may perform similar functions as TPs 111 and LMC 117 in gNBs 110-1 and 110-2, and accordingly, TPs 111 and 111a may be collectively referred to herein as TPs 111 and LMC 117 and 117a may be collectively referred to herein as LMC 117.

The location management functionality in the NG-RAN 135, i.e., LMC 117, may have comparable capability to a 5GCN LMF, e.g., LMF 120. In order to support additional NR Radio Access Technology (RAT) dependent position methods, additional LMC/LMF functionality may be included. An operator may restrict an LMC 117 to support of, e.g., NR RAT dependent positioning, if a 5GCN LMF 120 is present that supports other position methods or enable the LMC 117 to support most or all position methods if no 5GCN LMF 120 is present.

The LMC 117 may communicate with a gNB Central Unit (gNB-CU) as described later for FIG. 3. The LMC 117 may further manage one or more Transmission Points (TPs) 111 that are configured to transmit downlink (DL) reference signals (RSs) to be measured by the UE and one or more Reception Points (RPs) 113 that are configured to receive and measure uplink (UL) RSs transmitted by the UE.

An LMC 117 may support positioning of a UE 102 in a similar or identical manner to an LMF 120 and may support the same or similar position methods (e.g. OTDOA, RTT, AOD, AOA, UTDOA, ECID, A-GNSS, RTK). An LMC 17 may be part of a Central Unit (CU, also referred to as gNB-CU) in a gNB 110, where the CU may also manage and control the overall operation of the gNB 110 and serve as an endpoint for RRC communication with a UE 102, Xn communication with another gNB 110, NGAP communication with an AMF 115 and/or NRPPa communication with an LMF 120. Alternatively, LMC 117 may be a separate element in a gNB 110 and be connected to a CU in the gNB 110 (e.g. using an F1 interface). For example, the LMC 117 may request location measurements from the UE 102, e.g., using RRC or LPP, may manage UL location measurements by one or more gNBs 110 of the UE 102, and may provide cell database assistance data and/or UL location measurements to a UE 102 for position methods such as OTDOA, AOD and RTT. The LMC 117 may further manage static and dynamic scheduling of PRS broadcast and broadcast of assistance data by one or more gNBs 110, interact with neighboring gNBs 110, e.g., using XnAP and NRPPa, to coordinate location support, e.g., exchange UL location measurements for a UE 102 or coordinate changes to PRS transmission. The LMC 117 may determine a location estimate for a UE 102. The LMC 117 may provide a location service capability to a serving AMF 115, e.g., using a using a Next Generation Application Protocol (NGAP), provide a location service capability to an LMF 120, e.g., using NGAP, provide a location service capability to other gNBs, and provide a location service capability to a UE 102, e.g., using RRC or LPP. The above functions are provided as examples only. Additional or different functions may be performed if desired.

Peer level LMCs 117 may communicate using an Xn Application Protocol (XnAP) or a location specific protocol above XnAP in order to coordinate support of these functions, e.g. to enable continuing positioning of a UE 102 following a handover of UE 102 to a new serving gNB 110.

Thus, an LMC 117 may allow or support NG-RAN 135 determination of a UE 102 location which can be requested by the UE 102, e.g., using RRC or LPP, by a serving AMF 115, e.g., using NGAP or a location specific protocol conveyed by NGAP), or by another gNB 110/ng-eNB 114, e.g., using XnAP or a location specific protocol conveyed by XnAP. Such a capability could allow location support without the need for an LMF 120 (or possibly a GMLC 125 (shown in FIG. 1)) in the 5GC 140 and may also be used to reduce latency in position determination (since the NG-RAN 135 is closer to a UE 102 than an LMF 120) and offload location support from a central LMF 120.

A centralized LMF (possibly one or two per AMF shared over a large number of gNBs) is less suited for supporting a large number of UEs/location requests (e.g., for IoT applications). In that case, a distributed location server functionality (potentially in every gNB) would be better suited. An LMC in the RAN can serve UEs in a single gNB coverage area. A distributed location server functionality can also provide better fault tolerance and redundancy. E.g. in case of a serving LMC failure, an LMC in a neighbor gNB can be selected.

The signaling reduction and the avoidance of backhaul/AMF resources for a RAN LMC results in reduced network cost or (equivalently) a capability to support more positioning for the same network cost.

The signaling between an AMF 115 and NG-RAN 135 node may use a protocol layering, e.g., as defined in 3GPP Technical Specification (TS) 38.300 and 3GPP TS 23.501 and can make use of NGAP at the top level as defined in 3GPP TS 38.413. The NG-RAN 135 location reporting procedure is defined in 3GPP TS 23.502 and in 3GPP TS 38.413 and enables a serving AMF to request a serving NG-RAN node to report the UE location once only, periodically on a change of serving cell or periodically when a UE presence in an area of interest has changed. The location provided by the serving NG-RAN node comprises an NR or LTE Cell Global Identity CGI (CGI) and a Tracking Area Identity. The procedure may further include an optional Quality of Service (QoS) parameter in a Location Reporting Control message to enable a serving AMF 115 to request a more accurate location for a UE 102 than that corresponding to a CGI. The procedure may further include an optional list of supported Geographic Area Description (GAD) shapes in a Location Reporting Control message. The procedure may further include allowing the serving NG-RAN node to obtain a more accurate UE location when a QoS (e.g. using Enhanced Cell ID (ECID) positioning). The procedure may further permit an NG-RAN node (e.g. a gNB 110) to return a UE location to a serving AMF 115 using a GAD shape when requested in a Location Reporting Control message.

Figure 3:
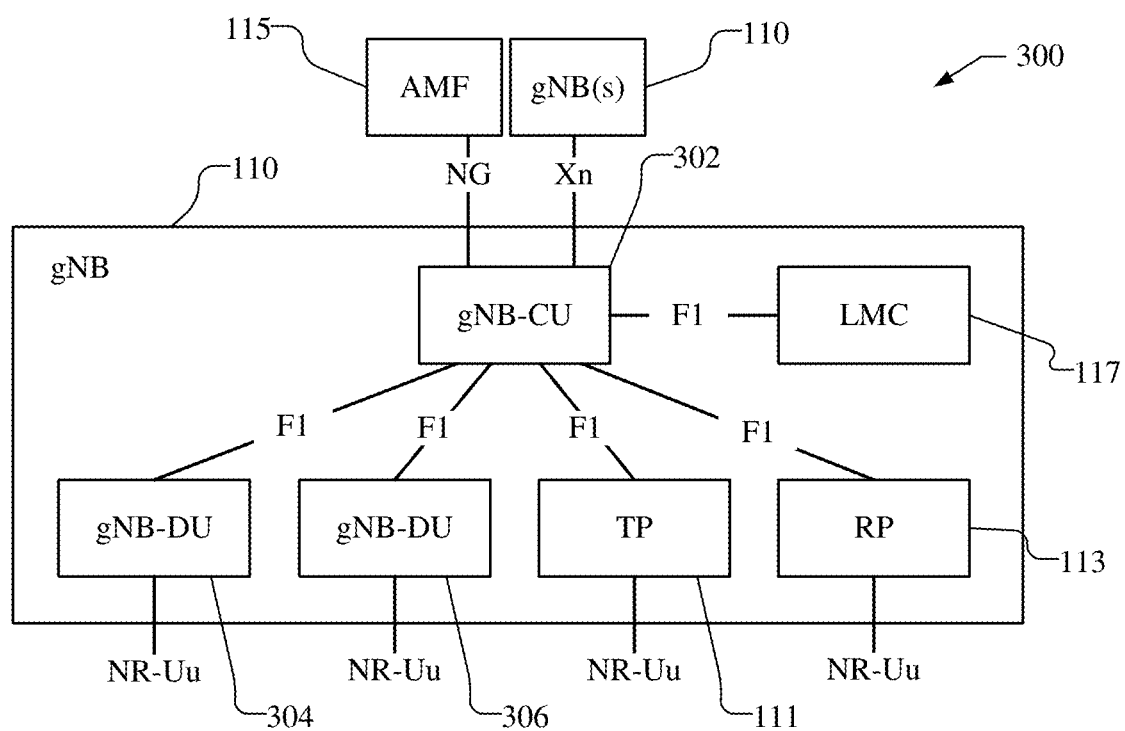
FIG. 3 shows an architecture diagram of an NG-RAN node that includes a Location Management Component.

FIG. 3 shows an architecture diagram of an NG-RAN node 300, which includes an LMC 117. The NG-RAN node 300 may be a gNB 110, according to one implementation. The architecture shown in FIG. 3, for example, may be applicable to any gNB 110-1, 110-2, and 110-3 in NG-RAN 135 shown in FIG. 1 or FIG. 2.

As illustrated gNB 110 includes a gNB Central Unit (gNB-CU) 302, and gNB Distributed Units (gNB-DUs) 304 and 306, which may be physically co-located in the gNB 110 or may be physically separate. The gNB-CU 302 is a logical or physical node hosting support for RRC, Service Data Adaptation Protocol (SDAP), and Packet Data Convergence Protocol (PDCP) protocols of the gNB 110 used over the NR Uu air interface and controlling the operation of one or more gNB-DUs 304, 306. The gNB-CU 302 terminates the F1 interface connected with the gNB-DU 304, 306. As illustrated, the gNB-CU 302 may communicate with an AMF 115 via an NG interface. The gNB-CU 302 may further communicate with one or more other gNBs 110 via the Xn interface. The gNB-DUs 304 and 306 are logical or physical nodes hosting support for Radio Link Control (RLC), Medium Access Control (MAC) and Physical (PHY) protocol layers used over the NR Uu air interface of the gNB 110, operation of which is partly controlled by gNB-CU 302. The gNB-DUs 304 and 306 terminate the F1 interface connected with the gNB-CU 302.

Additionally, as illustrated, gNB 110 may include a TP 111, an RP 113, and LMC 117, which may be physically or logically located in the gNB 110. The gNB-CU 302 may be configured to communicate with the TP 111, RP 113, and LMC 117, e.g., via F1 interfaces. The gNB-CU 302, thus, controls one or more TP 111 and RP 113 and the LMC 117, which are accessible from the gNB-CU 302 via an F1 interface.

In some embodiments, the NG-RAN node 300 (or gNB 110) may comprise a subset of the elements shown in FIG. 3. For example, the NG RAN node 300 may comprise the gNB-CU 302 and the LMC 117 but may not include one or more of gNB-DUs 304 and 306, RP 113 or TP 111. Alternatively, NG-RAN node 300 may include one or more of gNB-DUs 304 and 306, RP 113 or TP 111 but may not include LMC 117. Further, the elements shown in FIG. 3 may be logically separate but physically co-located or may be partially or completely physically separate. For example, LMC 117 may be physically separate from gNB-CU 302 or may be physically combined with gNB-CU 302. Similarly, one or more of gNB-DUs 304 and 306, RP 113 or TP 111 may be physically separate from gNB-CU 302 or may be physically combined with gNB-CU 302. In the case of physical separation, the F1 interface may define signaling over a physical link or connection between two separated elements. In some implementations, gNB-CU 302 may be split into a control plane portion, referred to as a CU-CP or gNB-CU-CP, and a user plane portion, referred to as CU-UP or gNB-CU-UP. In this case, both the gNB-CU-CP and gNB-CU-UP may interact with gNB-DUs 304 and 306 to support NR Uu air interface signaling for control plane and user plane, respectively. However, only the gNB-CU-CP may interact with LMC 117, TPs 111 and RPs 113 to support and control location related communication.

Protocol layering between the gNB-CU 302 and the TP 111, RP 113, and LMC 117 may be based on an F1 Control Plane (F1 C), e.g., as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures between the gNB-CU 302 and LMC 117 may comprise all location related procedures on NG, Xn, and NR-Uu interfaces. For example, the location procedures between AMF 115 and the NG-RAN node 300 may use NGAP. The location procedures between NG-RAN node 300 and other NG-RAN nodes, e.g., gNBs 110, may use XnAP or a protocol above XnAP, such as an extended NR Positioning Protocol A (NRPPa), e.g., as defined in 3GPP TS 39.455. The location procedures between NG-RAN node 300 and UE 102 may use RRC and/or LPP.

The corresponding messages to support positioning may be carried inside a transparent F1AP message transfer container. For example, the transfer of an NGAP Location Reporting Control and NAS Transport message may be carried in an UL/DL NGAP Message Transfer. The transfer of location related XnAP messages may be carried in an UL/DL XnAP Message Transfer. The transfer of location related RRC(LPP) messages may be carried in an UL/DL RRC (LPP) Message Transfer.

The above support may also be realized with a single F1AP UL/DL LMC Message Transfer container and/or a new location protocol transported using F1AP. Thus, a gNB-CU 302 could forward any location related transfer messages received on NG, Xn and Uu interfaces to the LMC 117 (either within the same gNB 110, e.g., in case the gNB includes an LMC, as illustrated in FIG. 3, or to another gNB, e.g., in case the gNB has no LMC).

The location procedures between the LMC 117 and the gNB-DUs 304 and 306, TP 111, and RP 113, which may be coordinated by a gNB-CU 302, may include the transfer of UL/DL PRS configuration and the transfer of UL/DL PRS measurement information. The above functionality may be similar to that of LTE LMUs as specified in 3GPP TS 36.305 and TS 36.459 (SLmAP) and also similar to that between LMF 120 and NG-RAN node 300. Therefore, NRPPa could be extended to support TRP location measurement/configuration messages which can be carried inside F1AP transport messages.

Thus, the NG-RAN node 300 may support signaling and location procedures between a gNB-CU 302 and LMC 117 based on F1AP to support the same location procedures as supported on NG, Xn, and NR-Uu interfaces and, in addition, support transfer of a UL/DL PRS configuration and measurements information to/from a gNB-DU/TRP from/to the LMC 117.

Figure 4:
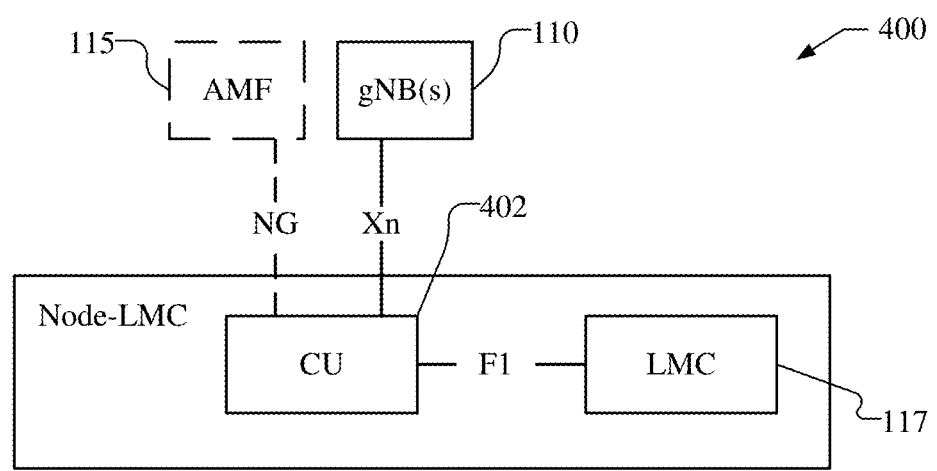
FIG. 4 shows an architecture diagram of another NG-RAN node that includes a Location Management Component.

FIG. 4 shows an architecture diagram of another NG-RAN node 400 that includes an LMC 117. The NG-RAN node 400 is similar to NG-RAN node 300 shown in FIG. 3, but does not include the gNB-DUs 304, 306, the TP 111 or RP 113. As the NG-RAN node 400 is not a gNB, the NG-RAN node 400 may be referred to as a Node-LMC 400. The Node-LMC 400 may be included in the NG-RAN 135 in addition to gNBs 110 and ng-eNB 114 and may support positioning of a UE 102 as a standalone location server similar to LMF 120 in 5GC 140.

As illustrated, the Node-LMC 400 includes a Control Unit (CU) 402, which is similar in functionality to gNB-CU 302 shown in FIG. 3 though may only include a gNB-CU-CP and not a gNB-CU-UP and does not have an interface with gNB-DUs 304, 306, the TP 111 or RP 113. The Node-LMC 400 also includes an LMC 117, which communicates with the CU 402 via an F1 interface. The CU 402 may communicate with one or more gNB(s) 110 via the Xn interface. As illustrated by the dashed line, the CU 402 may or may not have an NG interface with AMF 115. The CU 402 and the LMC 117 may be physically separate or combined.

Figure 5:
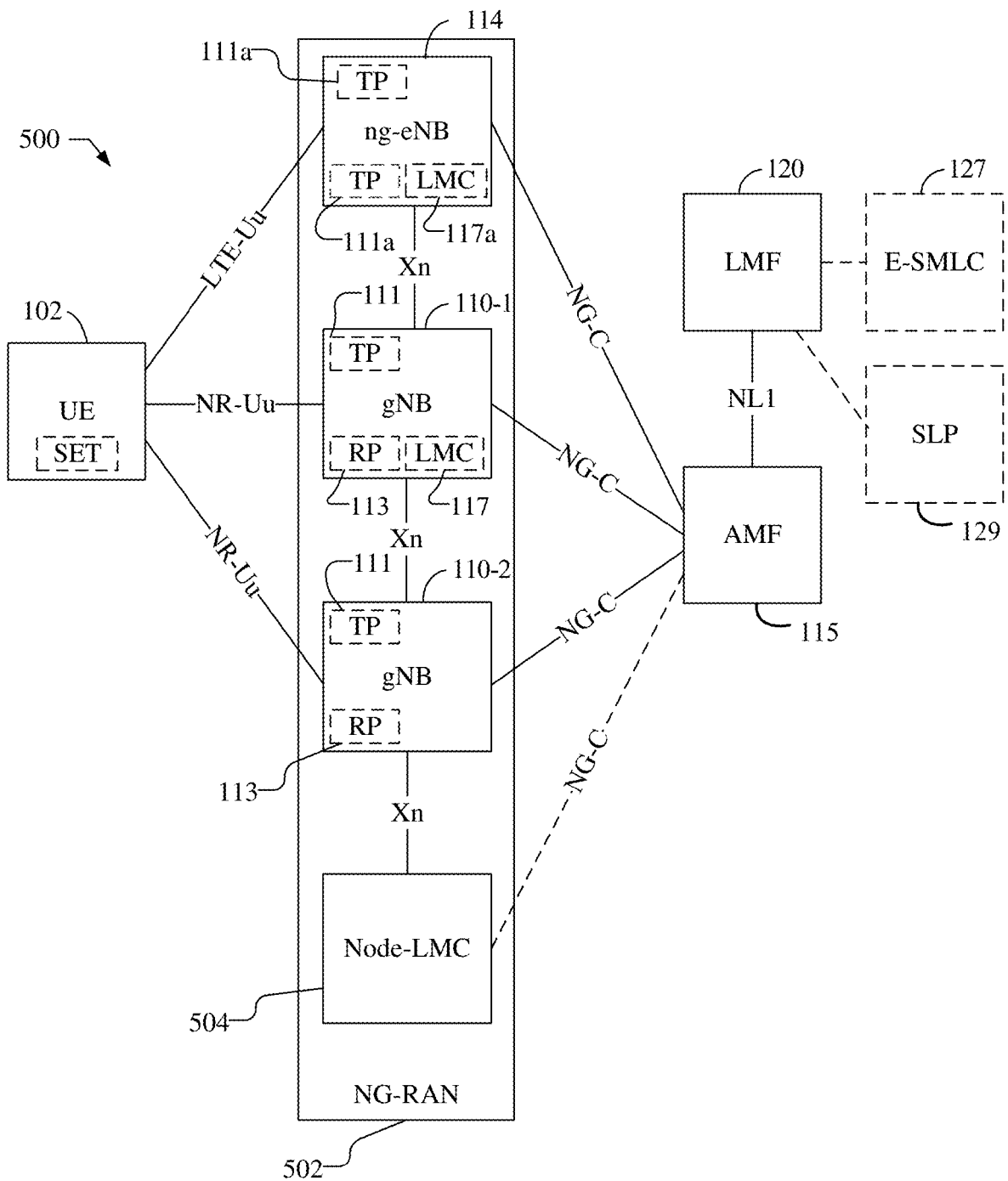
FIG. 5 shows a positioning architecture diagram of another communication system, which is similar to the communication system shown in FIG. 2.

FIG. 5 shows a positioning architecture diagram of communication system 500, according to an embodiment, which is similar to communication system 200 shown in FIG. 2.

As illustrated in FIG. 5, the gNB 110-2 does not include an LMC 117. The NG-RAN 502 in communication system 500, however, includes a Node-LMC 504, which may be similar to or the same as the Node-LMC 400 shown in FIG. 4. The gNB 110-2 may communicate via an Xn interface with the Node-LMC 504. Optionally, the Node-LMC 504 may include an NG-C interface with the AMF 115, as indicated with a dashed line.

Figure 6A:
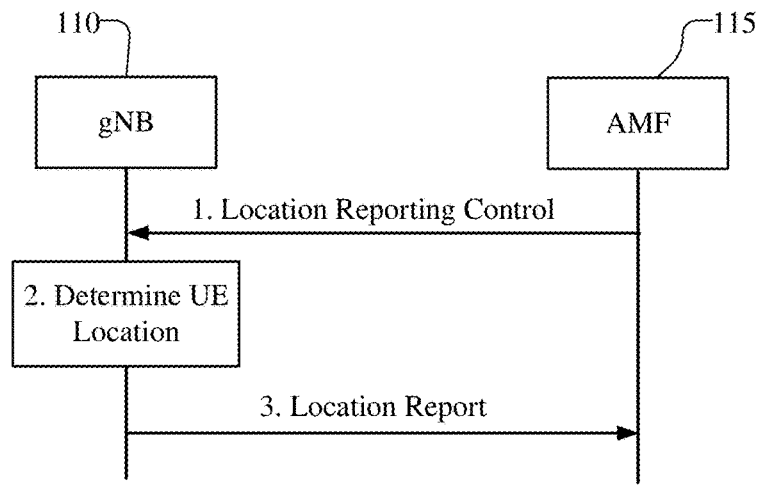
FIG. 6A shows an NG-RAN location reporting procedure illustrating the signaling between an AMF and the NG-RAN node.

FIG. 6A is an NG-RAN location reporting procedure illustrating the signaling between the AMF 115 and the NG-RAN Node, illustrated as gNB 110. The protocol layering between the AMF 115 and the serving gNB 110 may be as defined in 3GPP TS 38.300 clause 4.3.1.2 and 3GPP TS 23.501 clause 8.2.1.2, and may make use of NGAP at the top level as defined in 3GPP TS 38.413. The NG-RAN location reporting procedure for Rel-15 as defined in 3GPP TS 23.502 clause 4.10 and in TS 38.413 clause 8.12 enables a serving AMF to request a serving NG-RAN node to report the UE location once only, periodically on a change of serving cell or periodically when a UE presence in an area of interest has changed. However, in Rel-15 the location provided by the serving NG-RAN node comprises an NR or E-UTRA CGI and a Tracking Area Identity only. The procedure illustrated in FIG. 6A may enable a serving AMF 115 to request a more accurate location from NG-RAN.

At stage 1, an AMF 115 may send a Location Reporting Control message to the NG-RAN node, e.g., gNB 110, to request a target device location. An optional QoS parameter may be added to the Location Reporting Control message to enable a serving AMF 115 to request a more accurate location than that corresponding to a CGI. Additionally, an optional list of supported GAD shapes may be added in the Location Reporting Control message.

At stage 2, the LMC 117 in the serving gNB 110 then determines the UE location. The serving NG-RAN node may obtain a more accurate UE location when a QoS is provided (using an LMC).

At stage 3, the gNB 110 provides the location estimate back to the AMF 115 in a Location Report message. The UE location may be returned using a GAD shape when requested in a Location Reporting Control message.

Figure 6B:
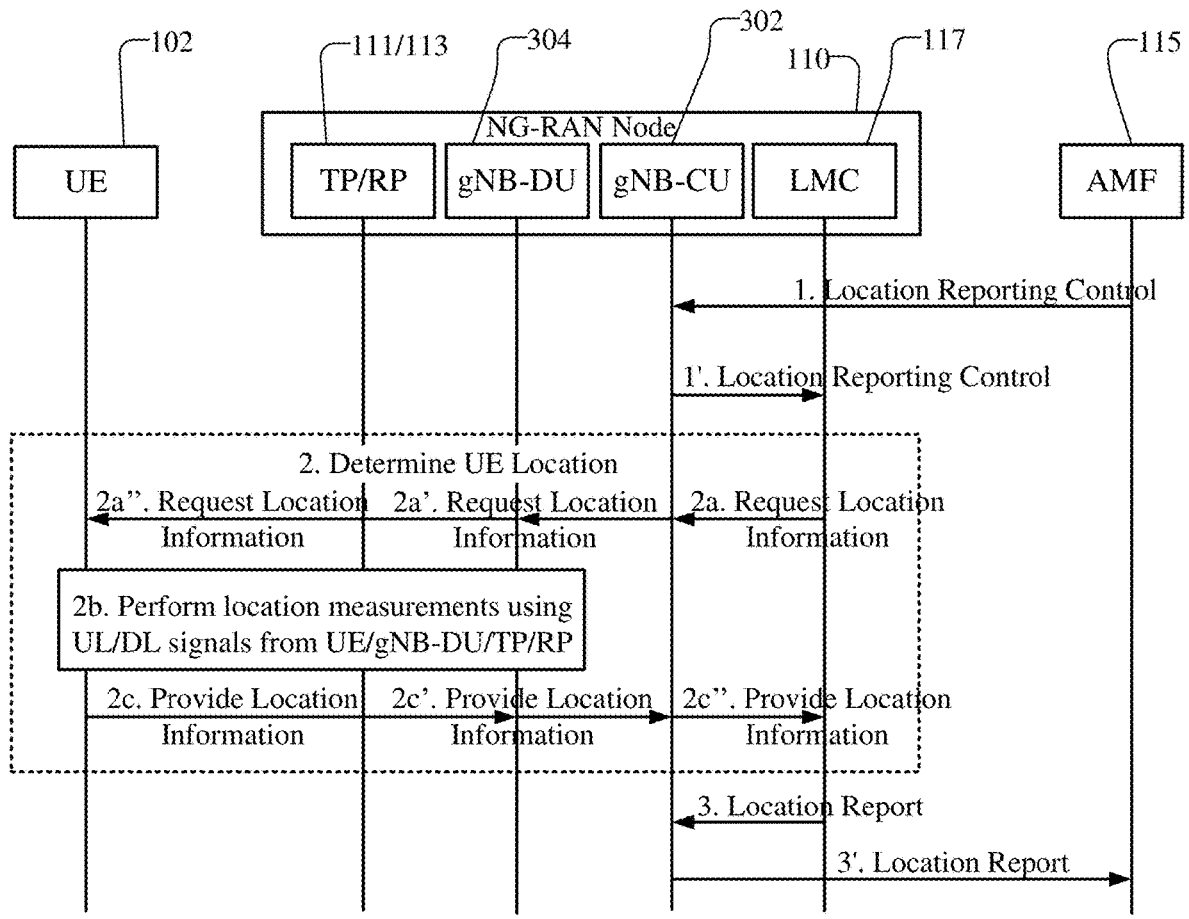
FIG. 6B shows an NG-RAN location reporting procedure illustrating internal message forwarding within the NG-RAN Node.

FIG. 6B is an NG-RAN location reporting procedure, similar to that shown in FIG. 6A, but further illustrates the internal message forwarding within the NG-RAN Node 300, which may be a gNB 110.

At stage 1, as discussed in FIG. 6A, an AMF 115 may send a Location Reporting Control message to the NG-RAN node 300, which is received by gNB-CU 302 (or the gNB-CU-CP portion of gNB-CU 302), to request a target device location. An optional QoS parameter may be added to the Location Reporting Control message to enable a serving AMF 115 to request a more accurate location than that corresponding to a CGI. Additionally, an optional list of supported GAD shapes may be added in the Location Reporting Control message.

At stage 1', the gNB-CU 302 forwards the Location Reporting Control message to the LMC 117 (e.g. inside an F1-AP container message).

At stage 2, as discussed in FIG. 6A, the LMC 117 in the serving gNB 110 determines the UE location. The serving NG-RAN node may obtain a more accurate UE location when a QoS is provided (using an LMC).

At stage 2a, for example, the LMC 117 instigates procedures to obtain a UE location and may send an LPP Request Location Information to the gNB-CU 302, e.g., inside an F1-AP container message.

At stage 2a', the LPP Request Location Information is forwarded from the gNB-CU 302 to the gNB-DU 304, e.g., inside an F1-AP container message.

At stage 2a", the LPP Request Location Information is sent from the gNB-DU 304 to the UE 102 over the air interface (NR-Uu).

At stage 2b, the UE 102 and/or TP 111 and/or RP 113 and/or gNB-DU 304 may make UL/DL signal measurements for location, e.g., UL-TDOA, DL-TDOA, RTT, etc.

At stage 2c, the UE 102 sends a Provide Location Information message to the gNB-DU 304 to send the measurements and/or a computed location to the gNB-DU 304.

At stage 2c', the gNB-DU 304 forwards the location information from the UE 102, along with any measurements made by the gNB-DU 304 or RP 113 to the gNB-CU 302, e.g., inside an F1-AP container message.

At stage 2c", the gNB-CU 302 forwards the location information to the LMC 117, e.g., inside an F1-AP container message. The LMC 117 may calculate the location (or verify the UE location) using the received location information.

At stage 3, the LMC 117 sends a Location Report to the gNB-CU 302 (e.g. inside an F1-AP container message).

At stage 3', the gNB-CU 302 forwards the Location Report to the AMF 115.

The Location Reporting procedure illustrated in FIG. 6B may be supported by an LMC 117 in a gNB 110 or LMC 117a in an ng-eNB 114. An NG RAN node without an LMC may forward a location request (with QoS higher than cell ID granularity) to a NG-RAN Node with an LMC (by forwarding a Location Reporting Control message using an XnAP transport message) and receive a later response from the LMC (a Location Report message conveyed by an XnAP transport message).

The NLs interface between an AMF (e.g., AMF 115) and LMF (e.g., LMF 120) supports location requests for a target UE (e.g., UE 102) sent from a serving AMF (e.g., AMF 115) for the target UE to an LMF as specified in 3GPP TS 29.572 using service operations based on the HyperText Transfer Protocol (HTTP) and response operations sent from the LMF to the serving AMF.

Instead of or in addition to the Location Reporting procedure described above, such service based location request/response operation messages may also be transported between the serving gNB and serving AMF for a target UE in an NGAP transport container. A gNB-CU without a collocated LMC may forward a location request to another gNB with LMC (by forwarding a location request message using an XnAP transport message) and receive a later response from the other gNB. This allows an AMF to use the same message/operation towards an LMF and LMC.

Figure 6C:
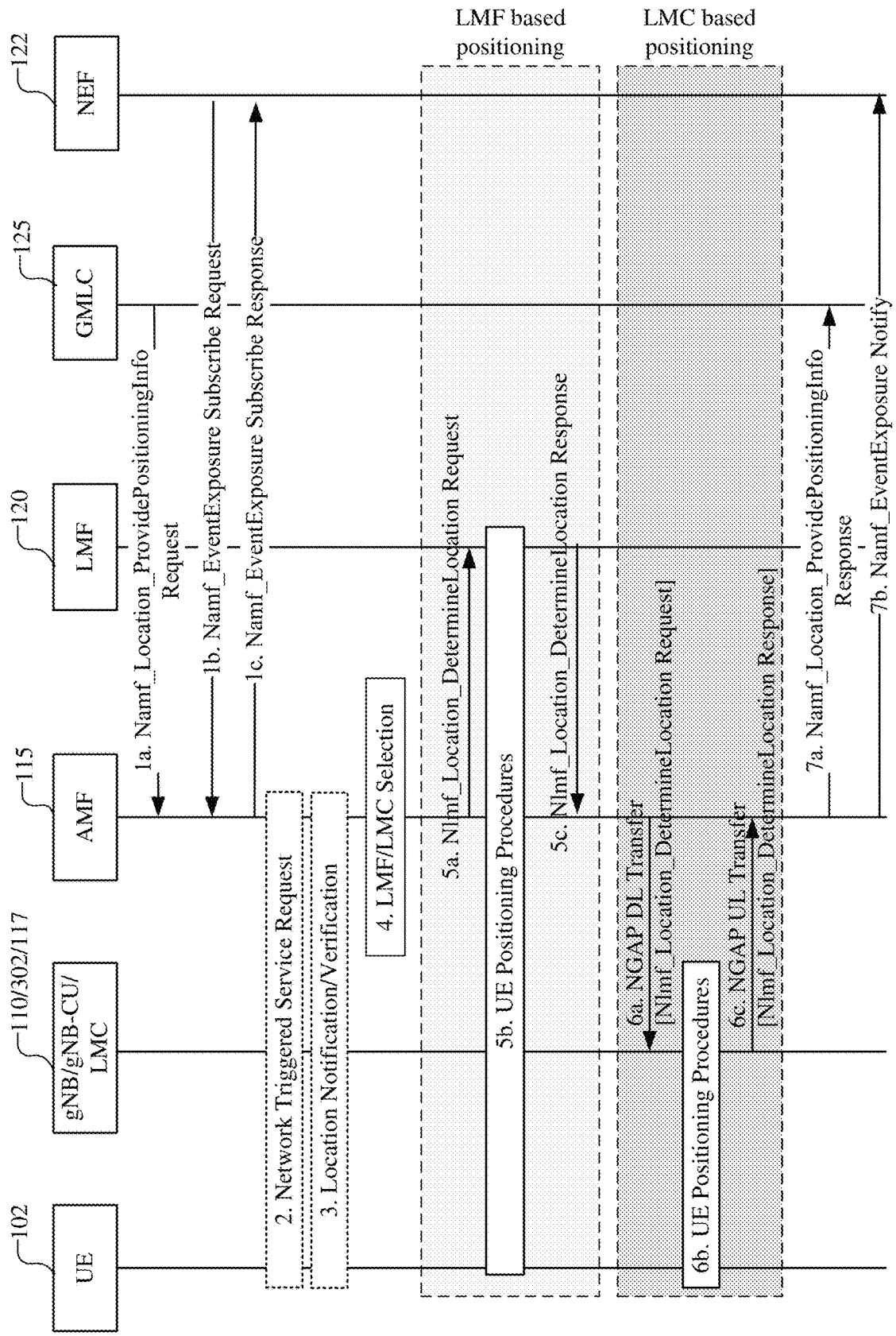
FIG. 6C illustrates a mobile terminated location request (MT-LR) procedure, in which the service based location request/response operation messages may be transported between the serving gNB and serving AMF for a target UE in an NGAP transport container.

FIG. 6C, for example, illustrates a mobile terminated location request (MT-LR) procedure, in which service based location request/response operation messages may be transported between the serving gNB 110 and serving AMF 115 for a target UE 102 in an NGAP transport container. For the MT-LR procedures, the serving AMF 115 in the Home or Visiting PLMN will receive at some point a location request for UE 102 from a GMLC (e.g. GMLC 125) to request the current location of the UE 102. This may occur as follows.

At optional stage 1a, the serving AMF 115 of the target UE 102 receives a Namf_Location_ProvidePositioningInfo Request service operation from a GMLC 125 (e.g., an H-GMLC or a V-GMLC). This service operation may include the Subscription Permanent Identifier (SUPI) for UE 102, a client type, and other information such as required Quality of Service (QoS), supported Geographic Area Description (GAD) shapes, etc.

At stage 1b, if stage 1a does not occur, the serving AMF 115 for the target UE 102 may receive a Namf-EventExposure Subscribe Request from the NEF 122.

At stage 1c, if stage 1b occurs, the serving AMF 115 may return a Namf_EventExposure_Subscribe Response to the NEF 122.

At stage 2, if the UE 102 is in an idle state, the AMF 115 initiates a network triggered Service Request procedure as defined in 3GPP TS 23.502 to establish a signaling connection with the UE 102.

At stage 3, if the UE 102 must either be notified or notified with privacy verification according to stage 1a and if the UE 102 supports Location Services (LCS) notification (e.g. according to UE 102 capability information), a notification invoke message is sent to the target UE 102, as specified in 3GPP TS 23.273. The target UE 102 may notify the UE user of the location request and, if privacy verification was requested, waits for the user to grant or withhold permission. The UE 102 then returns a notification result to the AMF 115 indicating, if privacy verification was requested, whether permission is granted or denied for the current LCS request.

At stage 4, the AMF 115 selects an LMF (e.g. LMF 120) or LMC (e.g. LMC 117). This may be based on the information as currently defined in 3GPP TS 23.273 or based on AMF local configuration. The LMF/LMC selection takes the NG-RAN 135 (shown in FIG. 1) currently serving the UE 102 into account. If an LMF is selected, stages 5 are performed with an LMF as defined in 3GPP TS 23.273 and stages 6 are not performed. If an LMC is selected, stages 6 are performed and stages 5 are not performed.

At stage 5a, if an LMF is selected at stage 4, the AMF 115 sends an Nlmf_Location_DetermineLocation Request messaged to the LMF 120.

At stage 5b, UE positioning procedures are performed applicable to LMF 120.

At stage 5c, the LMF 120 sends an Nlmf_Location_DetermineLocation Response message to the AMF 115.

At stage 6a, if an LMC is selected at stage 4, the AMF 115 sends a message for a service based protocol, such as an Nlmf_Location_DetermineLocation Request service operation, inside an NGAP DL Transfer message to the serving gNB 110 which is received by the gNB-CU 302. The service operation may include an LCS Correlation identifier, an indication as to whether the UE 102 supports LPP, the required QoS and Supported GAD shapes.

The serving gNB-CU 302 may forward the Nlmf_Location_DetermineLocation Request to a separate LMC 117 in the same gNB 110 in a F1AP transfer message.

At stage 6b, the LMC 117 performs positioning procedures (e.g. as described later for FIG. 6D) in order to obtain a location (or location estimate) for UE 102. This may include receiving a request for and providing assistance data to the UE 102, requesting the UE 102 to transmit UL PRS, requesting the UE 102 to perform measurement of DL PRS. The positioning procedure may further include: DL-PRS measurements and/or UL PRS transmission performed at the UE 102; DL PRS transmission from gNB-DUs 304 and/or TPs 111; UL-PRS measurements performed at gNB-DUs 304 and/or RPs 113, which in some implementations may be requested by and/or sent to the UE 102; and/or receiving a request from UE 102 for broadcast of assistance data in System Information messages by a serving gNB 110 and/or a change in DL PRS broadcast by a gNB 110.

At stage 6c, the gNB-CU 302 returns a message for a service based protocol, such as an Nlmf_Location_DetermineLocation Response message, inside an NGAP UL Transfer message to the AMF 115 to return the current location of the UE 102. If the LMC 117 is separate from the gNB-CU 302, the LMC 117 may first send the Nlmf_Location_DetermineLocation Response to the serving gNB-CU 302 in the same gNB 110 in a F1AP transfer message.

The message for stage 6c includes the LCS Correlation identifier, the location estimate, its age and accuracy and may include information about the positioning method(s) used at stage 6b.

At stage 7a, if stage 1a occurred, the AMF 115 may return an Namf_Location_ProvidePositioningInfo Response to the GMLC 125 to return the current location of the UE 102 as obtained at stage 5c or 6c. The GMLC 125 may perform additional privacy verification before returning the current location to an external client or AF.

At stage 7b, if stage 1b occurred, the AMF 115 may provide an Namf_EventExposure Notify message to the NEF 122.

Figure 6D:
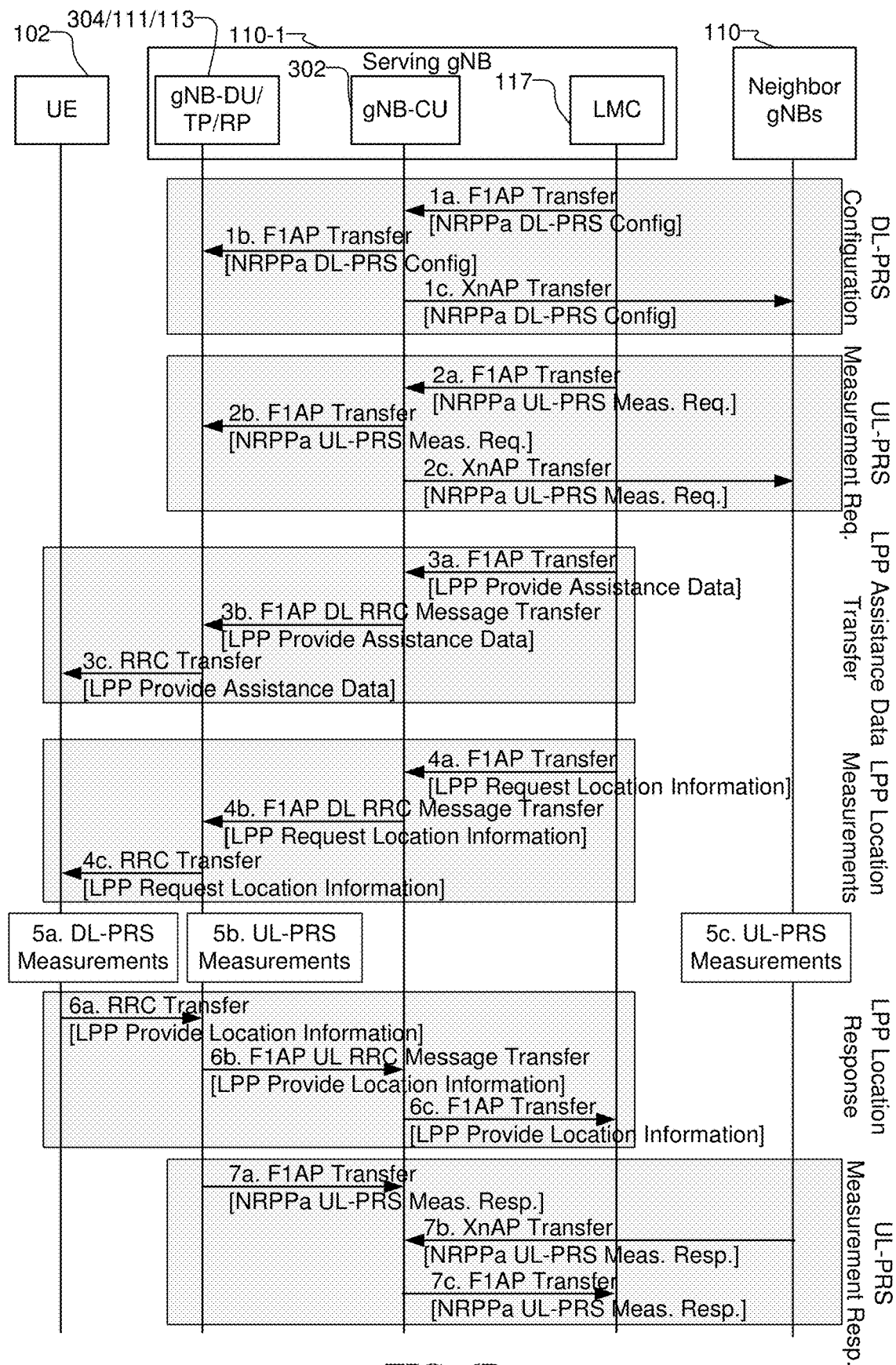
FIG. 6D illustrates positioning procedures in which an LMC interacts with neighbor gNBs and a UE.

FIG. 6D illustrates positioning procedures in which an LMC 117 exchanges location related messages with UE 102 and other gNBs 110. The positioning procedures shown in FIG. 6D may be performed to support stage 6b in FIG. 6C to determine a location for UE 102.

At stages 1 in FIG. 6D, illustrated as stages 1a, 1b, and 1c, for DL-PRS measurements, the LMC 117 may determine gNBs 110, gNB-DUs 304 and 306 (e.g., a serving gNB-DU 304) and/or TPs 111 nearby the approximate location of the target UE 102. If there are no or not sufficient DL-PRS resources configured on these gNBs/gNB-DUs/TPs, the LMC 117 may initiate an NRPPa procedure to configure (or reconfigure) DL PRS transmission, or a change in DL PRS broadcast, by the gNBs/gNB-DUs/TPs as described next for stages 1.

At stage 1a, the LMC 117 sends an NRPPa DL-PRS Configuration message inside a F1AP Transfer message to the gNB-CU 302 and indicates a destination gNB 110, destination TP 111 or destination gNB-DU 304 or 306 in the F1AP Transfer message.

At stages 1b and 1c, the gNB-CU 302 may forward the NRPPa DL-PRS Configuration message to the destination gNB DU 304 or 306 or TP 111 in an F1AP Transfer message or to a destination gNB 110 in an XnAP Transfer message. Stages 1a-1c may be repeated to send additional NRPPa DL-PRS Configuration messages to other gNB DUs 304 and 306, TPs 111 and/or gNBs 110.

In some implementations, the NRPPa messages sent for stage 1 may additionally or instead request a change in broadcast of location assistance data by a gNB-DU 304 and/or one or more other gNBs 110. The broadcast assistance data may, for example, provide information for DL PRS transmitted by gNB-DU 304 and/or other gNBs 110 at stages 5b and 5c (e.g. such as providing a frequency, timing, bandwidth, muting pattern and/or coding for DL PRS transmissions) which may assist UE 102 to obtain DL measurements at stage 5a.

At stages 2, illustrated as stages 2a, 2b, and 2c, to perform UL-PRS measurements, the LMC 117 sends an NRPPa UL PRS Measurement Request message to a destination gNB 110, destination RP 113 or destination gNB-DU 304 or 306. The message includes all information required to enable the gNB 110, gNB-DU 304 or 306 or RP 113 to perform UL measurements (e.g. including assistance data to assist UL measurements, which may include information for an UL PRS transmitted by UE 102 such as UL PRS frequency, bandwidth, timing and coding).

At stage 2a, the LMC 117 sends the NRPPa UL-PRS Measurement Request message inside a F1AP Transfer message to the gNB-CU 302 and indicates the destination gNB 110, destination RP 113 or destination gNB-DU 304 or 306 in the F1AP Transfer message.

At stages 2b and 2c, the gNB-CU 302 may forward the NRPPa UL-PRS Measurement Request message to the destination gNB DU 304 or 306 or RP 113 in an F1AP Transfer message or to a destination gNB 110 in an XnAP Transfer message. Stages 2a-2c may be repeated to send additional NRPPa UL-PRS Measurement Request messages to other gNB DUs 304 and 306, RPs 113 and/or gNBs 110.

At stages 3, illustrated as stages 3a, 3b, and 3c, the LMC 117 may send an LPP Provide Assistance Data message to the target UE 102, e.g., in response to a request for assistance data received from the UE 102 (not shown in FIG. 6D).

At stage 3a, the LMC 117 sends the LPP Provide Assistance Data message in a F1AP Transfer message to the gNB-CU 302 and may indicate that UE 102 is the final destination.

At stages 3b, the gNB-CU 302 forwards the LPP Provide Assistance Data message to the gNB-DU 304 in a F1AP Transfer message. The gNB-DU 304 then forwards the LPP message to the UE 102 inside an RRC Transfer message.

At stages 4, illustrated as stages 4a, 4b, and 4c, the LMC 117 may send an LPP Request Location Information message to the target UE 102.

At stage 4a, the LMC 117 sends the LPP Request Location Information message in a F1AP Transfer message to the gNB-CU 302.

At stages 4b, the gNB-CU 302 forwards the LPP Request Location Information message to the gNB-DU 304 in an F1AP Transfer message. At stage 4c, the gNB-DU 304 forwards the message to the UE 102 inside an RRC Transfer message.

In some embodiments, the LPP message for stages 3 and/or 4 may be replaced by an RRC message. In that case, the RRC Transfer message may not be used at stages 3c and/or 4c and may be replaced by the RRC message. The LPP or RRC messages for stages 3 and 4 may request UE 102 to transmit an UL PRS and/or obtain DL measurements of DL PRS transmitted by gNBs 110 and may include information for the UL PRS and/or DL PRS (e.g. frequency, bandwidth, coding and/or timing).

At stage 5a, UE 102 transmits an UL PRS and/or obtains DL measurements of DL PRS transmitted by gNBs 110 if requested by the LPP (or RRC) messages received at stages 3c and 4c.

At stages 5b and 5c, the gNBs 110, gNB-DUs 304 and/or 306, TPs 111 and/or RPs 113 which received the NRPPa messages for any of stages 1 and 2 transmit a DL PRS and/or obtain UL PRS measurements of UL PRS transmitted by UE 102 as requested by the NRPPa messages received at stages 1 and 2.

At stages 6, illustrated as stages 6a, 6b, and 6c, the UE 102 sends an LPP Provide Location Information message to the LMC 117.

At stage 6a, the UE 102 sends the LPP Provide Location Information message in an RRC Transfer message to the serving gNB-DU 304, and may include any DL PRS measurements obtained at stage 5a and/or may indicate whether UL PRS transmission was performed successfully at stage 5a.

At stage 6b, the gNB-DU 304 forwards the LPP Provide Location Information message to the gNB-CU 302 inside a F1AP Transfer message.

At stage 6c, the gNB-CU 302 forwards the LPP Provide Location Information message to the LMC 117 inside a F1AP Transfer message. The Provide Location Information message may include a location for UE 102 determined by UE 102 (e.g. based on DL PRS measurements obtained by UE 102 at stage 5a) or (as previously described) may include DL PRS measurements obtained by UE 102 at stage 5a.

At stages 7, illustrated as stages 7a, 7b, and 7c, each gNB 110, gNB-DU 304, and/or 306 and/or RP 113 which obtained UL PRS measurements at stage 5b or 5c of UL PRS transmitted by UE 102 reports the UL PRS measurements to the LMC 117 in an NRPPa UL PRS Measurement Response message.

At stages 7a and 7b, the NRPPa UL-PRS Measurement Response message is sent to the serving gNB-CU 302 inside an F1AP Transfer message from a gNB-DU 304 or 306 or RP 113 in the serving gNB 110-1 or inside an XnAP Transfer message from a neighbor gNB 110.

At stage 7c, the serving gNB-CU 302 forwards the NRPPa UL-PRS Measurement Response message to the LMC 117 inside an F1AP Transfer message.

Following (or as part of) stage 6c and 7c, LMC 117 may obtain a location for UE 102 based on any location received from UE 102 at stage 6 or as determined by LMC 117 using the UL PRS measurements received at stage 7c and/or DL PRS measurements received at stage 6c.

To support broadcast of location assistance data by NG-RAN 135, the procedures for broadcast of location assistance data for E-UTRA connected to EPC as specified in 3GPP TS 36.305 may be reused. In case broadcast of assistance data is supported by an LMC 117, the LMC 117 would perform any segmentation and ciphering and provides pre-coded position System Information Blocks (posSIBs) for broadcast in System Information (SI) messages. The ciphering keys would then be provided by an LMC 117 to an AMF 115 for distribution to suitably subscribed UEs using mobility management messages. The Location Services Application Protocol (LCS-AP) Ciphering Key Data message may be reused (or adapted) for this purpose transported inside NGAP non-UE associated UL/DL signaling messages.

Figure 7:
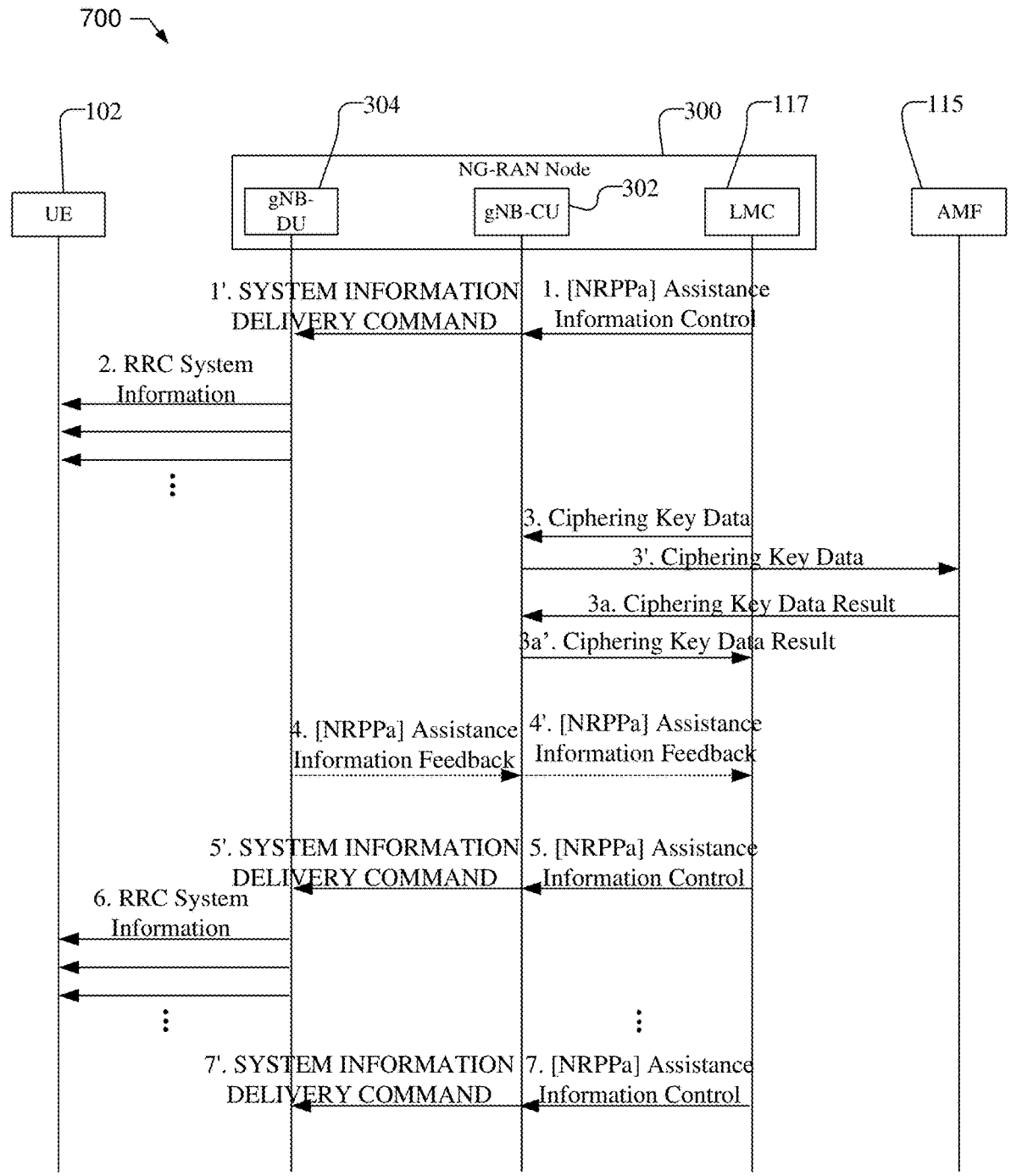
FIG. 7 shows a procedure for supporting Location Management Component (LMC) based broadcast of assistance data by an NG-RAN.

FIG. 7 is a procedure supporting LMC based broadcast of assistance data by the NG-RAN 300. The LMC 117 performs any segmentation and ciphering and provides pre-coded posSIBs for broadcast in SI messages. Ciphering keys are then provided by LMC 117 in the NG-RAN to AMF 115 for distribution to suitably subscribed UEs using mobility management messages.

At stage 1, the LMC 117 sends an NRPPa Assistance Data Information Control message to the gNB-CU 302 with an indication to start broadcasting assistance information. The message includes one or more System Information groups, where each group contains the broadcast periodicity and one or more pre-coded posSIB types together with meta data. Each posSIB type may be ciphered and/or segmented at the LMC 117. The meta data may include an indication whether the posSIB type in the System Information group is ciphered or not, as well as an indication of an applicable GNSS type.

At stage 1', the gNB-CU 302 sends a System Information Delivery Command to the gNB-DU 304.

At stage 2, the gNB-DU 304 includes the received System Information groups in RRC System Information Messages and corresponding scheduling information. The UE 102 applies system information acquisition procedures for acquiring the assistance data information that is broadcast.

At stage 3, if the posSIB types were ciphered by the LMC 117, the LMC 117 provides the used ciphering keys, together with a validity time and validity area for each key, to the gNB-CU 302.

At stage 3', the gNB-CU 302 forwards the used ciphering keys, together with a validity time and validity area for each key to the AMF 115.

At stage 3a, the AMF 115 returns a Ciphering Key Data Result message back to the gNB-CU 302 indicating whether the AMF 115 was able to successfully store the ciphering data sets. The AMF 115 may then distribute successfully stored ciphering keys and their validity times and validity areas to suitably subscribed UEs using a mobility management message. The AMF 115 repeats this procedure whenever a ciphering key changes.

At stage 3a', the gNB-CU 302 forwards the Ciphering Key Data Result message to the LMC 117.

At stage 4, at any time after stage 1, the gNB-DU 304 may send an NRPPa Assistance Information Feedback message to the gNB-CU 302 providing feedback on assistance information broadcasting. The message may include an assistance information failure list indicating that certain posSIB types could not be configured for broadcasting by the gNB-DU 304.

At stage 4', the gNB-CU 302 forwards the NRPPa Assistance Information Feedback message to the LMC 117.

At stage 5, if the assistance information in a System Information group changes, the LMC 117 provides updated information in an NRPPa Assistance Information Control message to the gNB-CU 302.

At stage 5', the gNB-CU 302 forwards the updated information to the gNB-DU 304 in a System Information Delivery Command.

At stage 6, the gNB-DU 304 replaces the previously stored System Information groups with the new information received at stage 5' and includes the new System Information groups in RRC System Information Messages.

At stage 7, if the LMC 117 wants to abort the broadcast of a System Information Group, it sends an NRPPa Assistance Information Control message to the gNB-CU 302 including an indication to stop broadcasting the assistance information.

At stage 7', the gNB-CU 302 forwards the indication to stop broadcasting the assistance information to the gNB-DU 304 in a System Information Delivery Command.

Signaling between NG-RAN nodes, e.g., between pairs of gNBs 110 or between a gNB 110 and Node-LMC 400, may use protocol layering, e.g., as defined in 3GPP TS 38.300 clause 4.3.2.2, which uses XnAP at the top level as defined in 3GPP TS 38.423. New messages to support positioning may be added directly into XnAP or could be included in a new location specific protocol which is transported using XnAP. A new location protocol which is transported in XnAP (and e.g. F1AP, as discussed above,) which covers the various functionalities and endpoints required for location support in NG-RAN may be used. As an alternative, NRPPa may be extended and reused to support the NG-RAN location functionality.

Location procedures between pairs of NG-RAN nodes, e.g., pairs of gNBs 110 or between a gNB 110 and Node-LMC 400, may support various functions. For example, one NG-RAN Node (e.g. a serving NG-RAN node with an LMC 117) may request UL measurements for a target UE 102 from another NG-RAN Node. One NG-RAN Node (e.g. a serving NG-RAN node with an LMC 117) may provide assistance data for a target UE 102 to another NG-RAN Node to assist UL measurements of the target UE 102 by the other NG-RAN Node. One NG-RAN Node may request a change in DL PRS broadcast scheduling and configuration in a neighbor NG RAN Node. One NG-RAN Node may request a change in scheduling and resources for broadcast of location information in a neighbor NG-RAN Node. A serving NG-RAN Node without LMC may transfer an LPP container to a neighbor NG-RAN Node with LMC.

Signaling between an NG-RAN Node, e.g., gNB 110-1 and the UE 102 may use protocol layering, e.g., as defined in 3GPP TS 38.300 clause 4.4.2 which uses RRC as defined in 3GPP TS 38.331 and 3GPP TS 36.331 at the top level.

Positioning procedures between an NG-RAN Node and UE 102 may reuse LPP, which may be the lowest impact and simplest solution, and also makes UE positioning procedures agnostic to where the location server is located, i.e., 5GCN LMF or NG-RAN LMC.

LPP messages and procedures may be enabled in RRC via additional UL/DL RAN Information Transfer Container messages, e.g., similar to UL/DL Information Transfer for NAS messages, which would have minimal RRC impacts.

The RRC signaling to request measurement gaps, e.g., Location Measurement Indication, may be reused and extended in Rel-16.

The RRC signaling for broadcast of assistance data may make use of existing System Information broadcast in NG RAN, similar as specified for LTE Rel-15.

RRC signaling may be used to deliver UL location measurements to the UE 102; e.g., in order to support UE centric RTT positioning and efficient hybrid positioning. This may also be realized via an RRC DL Information Transfer container which contains an LPP message, e.g., as additional assistance data.

Therefore, the location procedures between a serving NG-RAN Node, e.g., gNB 110-1, and UE 102 may support one or more of the following functions. All elementary LPP procedures defined in 3GPP TS 36.355, where the individual LPP messages for a procedure are transported in (transparent) RRC UL/DL Information Transfer Container messages. A target UE 102 may request assistance data from a serving NG-RAN Node to assist location measurements by the target UE 102, e.g., by sending an LPP request which may be transported in an RRC message. A target UE 102 may request UL location measurements from a serving NG-RAN Node, e.g., by sending an LPP request which may be transported in an RRC message. NG-RAN Nodes may broadcast assistance data in System Information messages. A UE 102 may send request, e.g., an LPP request which may be transported in an RRC message, for a change in DL PRS broadcast scheduling and configuration to a serving NG-RAN Node, e.g., gNB 110-1. A UE 102 may send a request, e.g., an LPP request which may be transported in an RRC message, for broadcast of location information to a serving NG-RAN Node. These functions may be supported at the LPP level and not at the RRC level.

Figure 8:
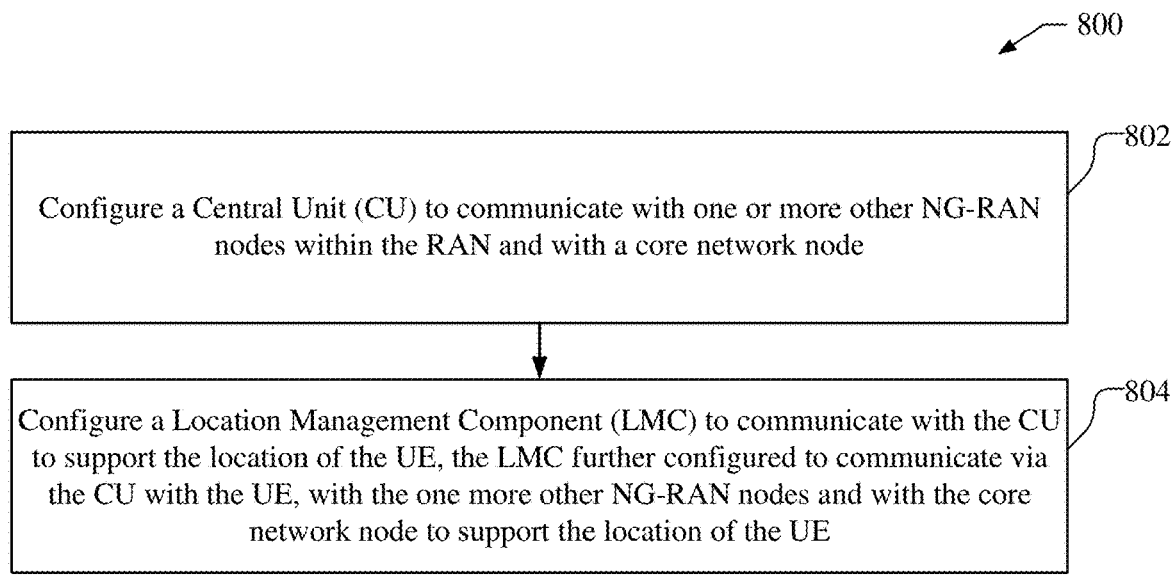
FIG. 8 shows a process flow illustrating a method for supporting positioning with a user equipment performed by a Next Generation Radio Access Network (NG-RAN) node in a wireless network.

FIG. 8 shows a process flow 800 illustrating a method for supporting positioning of a user equipment (UE), e.g., UE 102, performed by a Next Generation Radio Access Network (NG-RAN) node, such as a gNB 110, NG-RAN node 300 or 400, in a radio access network (RAN) such as NG-RAN 135.

Process flow 800 may start at block 802, where a Central Unit (CU), e.g., a gNB-CU or gNB-CU-CP, is configured to communicate with one or more other NG-RAN nodes, e.g., other gNBs 110, within the RAN and with a core network node, as shown FIGS. 3 and 4 and at stages 1, 1', 3, and 3' of FIG. 6B. At block 804, a Location Management Component, e.g., LMC 117, is configured to communicate with the CU to support the positioning of the UE, the LMC further configured to communicate via the CU with the UE, via the CU with the one or more other NG-RAN nodes and via the CU with the core network node to support the positioning of the UE, as shown in FIGS. 3 and 4, and stages 1', 2a, 2a', 2a", 2c, 2c', 2c", and 3 of FIG. 6B.

In one implementation, the LMC is physically separate from the CU, as described in FIG. 2. In one implementation, the LMC and the CU are physically combined, as described in FIG. 2.

In one implementation, configuring the LMC to support the positioning of the UE comprises configuring the LMC to perform at least one of: requesting and receiving downlink (DL) location measurements from the UE; managing uplink (UL) location measurements by the NG-RAN node of the UE; sending assistance data to the UE; sending UL location measurements to the UE; managing static and dynamic scheduling of DL broadcast of reference signals (e.g. including a PRS or a Tracking Reference Signal (TRS)) by the NG-RAN node; managing static and dynamic scheduling of DL broadcast of assistance data by the NG-RAN node; interacting with the one or more other NG-RAN nodes to coordinate location support for the UE; determining a location estimate for the UE; providing a location service capability to the core network node; providing a location service capability to the one or more other NG-RAN nodes; or providing a location service capability to the UE, as described in FIG. 2.

In one implementation, the NG-RAN node comprises a New Radio (NR) Node B (e.g. gNB 110), the core network node comprises an Access and mobility Management Function (e.g. AMF 115), and the CU comprises a gNB-CU (e.g. gNB-CU 302) or gNB-CU-CP, as described in FIG. 6B.

In one implementation, the LMC is configured to communicate with the one or more other NG-RAN nodes via the CU using an Xn Application Protocol (XnAP) or a location specific protocol transported by XnAP. For example, the location specific protocol may be an NR Positioning Protocol A (NRPPa) as defined in 3GPP TS 38.455, as described in FIG. 3.

In one implementation, configuring the LMC to communicate with the one or more other NG-RAN nodes via the CU comprises configuring the LMC to perform at least one of: sending a request for uplink (UL) measurements for the UE to at least one of the one or more other NG-RAN nodes; sending assistance data to assist the UL measurements for the UE to the at least one of the one or more other NG-RAN nodes; sending a request for a change in downlink (DL) reference signal (RS) broadcast to at least one of the one or more other NG-RAN nodes; sending a request for a change in broadcast of location assistance data to at least one of the one or more other NG-RAN nodes; or receiving a location related message sent by the UE from one of the one or more other NG-RAN nodes, as described in FIG. 7.

In one implementation, the LMC is configured to communicate with the core network node via the CU using a Next Generation Application Protocol (NGAP) or a location related protocol transported by NGAP, as described in FIGS. 2, 3, and 6A.

In one implementation, configuring the LMC to communicate with the core network node via the CU comprises configuring the LMC for: receiving an NGAP location reporting control message from the core network node; obtaining a location of the UE; and sending an NGAP location report to the core network node with the location of the UE, as described in FIGS. 6A and 6B.

In one implementation, the LMC is configured to communicate with the UE via the CU using a Radio Resource Control (RRC) protocol or a location specific protocol transported by RRC. For example, the location specific protocol may be a Long Term Evolution Positioning Protocol (LPP) as defined in 3GPP TS 36.355, as described in FIG. 6B.

In one implementation, configuring the LMC to communicate with the UE via the CU comprises configuring the LMC to perform at least one of: receiving a request for assistance data from the UE to assist location measurements by the UE; sending assistance data to the UE to assist location measurements by the UE; receiving a request from the UE for uplink (UL) location measurements of the UE; sending UL location measurements of the UE to the UE; receiving a request from the UE for broadcast of assistance data in System Information messages by the NG-RAN node; or receiving a request (e.g. an LPP or RRC request) from the UE for a change in downlink (DL) reference signal (e.g. PRS or TRS) broadcast by the NG-RAN node, as described in FIG. 2.

In one implementation, the CU is configured to communicate with the LMC through an F1 interface, as described in FIGS. 3 and 4.

In one implementation, the method may further include at least one of: configuring the CU to communicate with and control a Transmission Point (TP) configured to transmit downlink (DL) reference signals (e.g. PRS or TRS) to be measured by the UE to support the positioning of the UE; configuring the CU to communicate with and control a Reception Point (RP) configured to receive and measure uplink (UL) RSs (e.g. an UL PRS or an UL Sounding Reference Signal (SRS)) transmitted by the UE to support the positioning of the UE; or configuring the CU to communicate with and control a gNB Distributed Unit (gNB-DU) configured to transmit downlink (DL) reference signals (e.g. PRS or TRS) to be measured by the UE to support the positioning of the UE, or to receive and measure uplink (UL) reference signals (RSs) transmitted by the UE to support the positioning of the UE, as described in FIG. 3.

In one implementation, the CU is configured to communicate with the TP through an F1 interface, wherein the CU is configured to communicate with the RP through an F1 interface, wherein the CU is configured to communicate with the gNB-DU through an F1 interface, as described in FIG. 3.

In one implementation, the LMC is configured to communicate with the TP via the CU, wherein the LMC is configured to communicate with the RP via the CU, wherein the LMC is configured to communicate with the gNB-DU via the CU, as described in FIG. 3.

Figure 9:
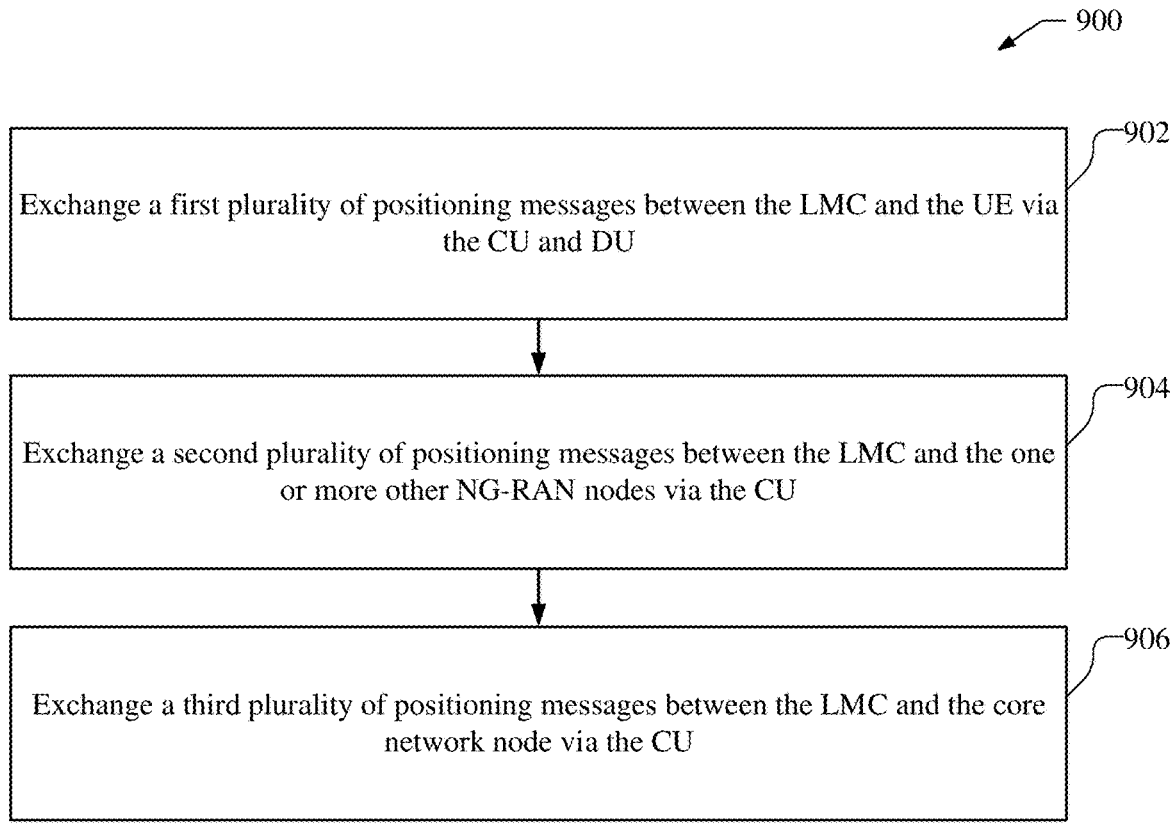
FIG. 9 shows a process flow illustrating a method for supporting positioning of a user equipment performed by a Next Generation Radio Access Network (NG-RAN) node in a radio access network (RAN).

FIG. 9 shows a process flow 900 illustrating a method for supporting positioning of a user equipment (UE), e.g., UE 102, performed by a Next Generation Radio Access Network (NG-RAN) node, such as a gNB 110, NG-RAN node 300 or 400, in a radio access network (RAN) such as NG-RAN 135. The NG-RAN node comprises a Central Unit (CU), e.g., a gNB-CU 302, configured to communicate with one or more other NG-RAN nodes (e.g. other gNBs 110) within the RAN and with a core network node, a Location Management Component (LMC), e.g., LMC 117, configured to communicate with the CU to support the positioning of the UE, and a Distributed Unit (DU), e.g., gNB-DU 304 or 306, configured to communicate with the UE.

Process flow 900 may start at block 902, which may be optional, with exchanging a first plurality of positioning messages between the LMC and the UE via the CU and DU, as described for stage 2 of FIG. 6B, stage 6b of FIG. 6C and stages 3, 4, and 6 of FIG. 6D. At block 904, which may be optional, a second plurality of positioning messages is exchanged between the LMC and the one or more other NG-RAN nodes via the CU, as shown in stages 1, 2 and 7 of FIG. 6D. At block 906, a third plurality of positioning messages is exchanged between the LMC and the core network node via the CU, as shown at stages 1 and 3 of FIG. 6B and stages 6a and 6c of FIG. 6C.

In one implementation, the LMC may be physically separate from the CU, e.g., as discussed in reference to FIG. 3.

In one implementation, the LMC and the CU may be physically combined, e.g., as discussed in reference to FIG. 3.

In one implementation, the first plurality of positioning messages may be messages for a Long Term Evolution (LTE) Positioning Protocol (LPP) or a Radio Resource Control (RRC) protocol, as discussed in reference to stages 3, 4, and 6 of FIG. 6D. For example, in one implementation, exchanging the first plurality of positioning messages between the LMC and the UE via the CU and DU includes at least one of: exchanging each of the first plurality of positioning messages between the LMC and the CU inside an F1 Application Protocol (F1AP) Transfer message, as shown in stages 3a, 4a, and 6c of FIG. 6D; exchanging each of the first plurality of positioning messages between the CU and the DU inside an F1AP Transfer message, as shown in stages 3b, 4b, and 6b of FIG. 6D; exchanging at least one of the first plurality of positioning messages between the DU and the UE inside an RRC Transfer message, as shown in stages 3c, 4c, and 6a of FIG. 6D; or some combination of these.

In one implementation, the second plurality of positioning messages may be messages for a New Radio Positioning Protocol A (NRPPa), as shown in stages 1, 2 and 7 of FIG. 6D. For example, in one implementation, exchanging the second plurality of positioning messages between the LMC and the one or more other NG-RAN nodes via the CU includes at least one: exchanging each of the second plurality of positioning messages between the LMC and the CU inside an F1 Application Protocol (F1AP) Transfer message, as shown in stages 1a, 2a and 7c of FIG. 6D; exchanging at least one of the second plurality of positioning messages between the CU and the DU inside an F1AP Transfer message, as shown in stages 1b, 2b and 7a of FIG. 6D; exchanging at least one of the second plurality of positioning messages between the CU and at least one of the one or more other NG-RAN nodes inside an Xn Application Protocol (XnAP) Transfer message, as shown in stages 1c, 2c and 7b of FIG. 6D; or some combination of these.

In one implementation, the third plurality of positioning messages may be messages for a service based protocol, as shown at stages 6a and 6c of FIG. 6C. For example, in one implementation, exchanging the third plurality of positioning messages between the LMC and the core network node includes at least one of: exchanging each of the third plurality of positioning messages between the LMC and the CU inside an F1 Application Protocol (F1AP) Transfer message, as described for stages 6a and 6c of FIG. 6C; exchanging each of the third plurality of positioning messages between the CU and the core network node inside a Next Generation Application Protocol (NGAP) message, as shown at stages 6a and 6c of FIG. 6C; or some combination of these.

In one implementation, the NG-RAN node comprises a New Radio (NR) Node B (e.g. a gNB 110), the core network node comprises an Access and mobility Management Function (e.g. AMF 115), the CU comprises a gNB-CU (e.g. gNB 302), and the DU comprises a gNB-DU (e.g. gNB 304 or 306), e.g., as shown in FIG. 3.

In one implementation, exchanging the second plurality of positioning messages between the LMC and the one or more other NG-RAN nodes includes at least one of: sending a request for uplink (UL) measurements for the UE to at least one of the one or more other NG-RAN nodes, as shown in stage 2c of FIG. 6D; receiving uplink (UL) measurements for the UE from at least one of the one or more other NG-RAN nodes, as shown in stage 7b of FIG. 6D; sending assistance data to assist UL measurements for the UE to at least one of the one or more other NG-RAN nodes, as described for stage 2 of FIG. 6D; sending a request for a change in downlink (DL) positioning reference signal (PRS) broadcast to at least one of the one or more other NG-RAN nodes, as described for stage 1 of FIG. 6D; sending a request for a change in broadcast of location assistance data to at least one of the one or more other NG-RAN nodes, as discussed in reference to stage 1 for FIG. 6D; or some combination of these.

In one implementation, exchanging the first plurality of positioning messages between the LMC and the UE includes at least one of: receiving a request for assistance data from the UE to assist location measurements by the UE, as described for stage 6b of FIG. 6C and stage 3 of FIG. 6D; sending assistance data to the UE to assist location measurements by the UE, as described for stage 6b of FIG. 6C and stage 3 of FIG. 6D; sending a request to the UE for transmission of an uplink positioning reference signal (UL PRS) by the UE, as described for stage 6b of FIG. 6C and stages 3 and 4 of FIG. 6D; sending a request to the UE for measurement of a downlink positioning reference signal (DL PRS) by the UE as described for stage 6b of FIG. 6C and stages 3 and 4 of FIG. 6D; receiving measurements of a DL PRS from the UE; receiving a request from the UE for uplink (UL) location measurements of the UE as described for stage 6b of FIG. 6C; sending UL location measurements of the UE to the UE as described for stage 6b of FIG. 6C; receiving a request from the UE for broadcast of assistance data in System Information messages by the NG-RAN node, as discussed for stage 6b of FIG. 6C; receiving a request from the UE for a change in downlink (DL) positioning reference signal (PRS) broadcast by the NG-RAN node, as discussed for stage 6b of FIG. 6C; or some combination of these.

In one implementation, the CU is configured to communicate with the LMC through an F1 interface, e.g., as discussed in reference to FIG. 3.

In one implementation, the NG-RAN node obtains a location of the UE, which may be determined by the UE and provided to the LMC as part of block 902 (e.g. as described for stage 6 for FIG. 6D) or may be determined by the LMC as described for stages 6 and 7 of FIG. 6D. For example, the LMC may determine the UE location based on: (i) UL location measurements received by the LMC from the DU and/or from the one or more other NG-RAN nodes as part of block 904; and/or (ii) DL location measurements received by the LMC from the UE as part of block 902.

Figure 10:
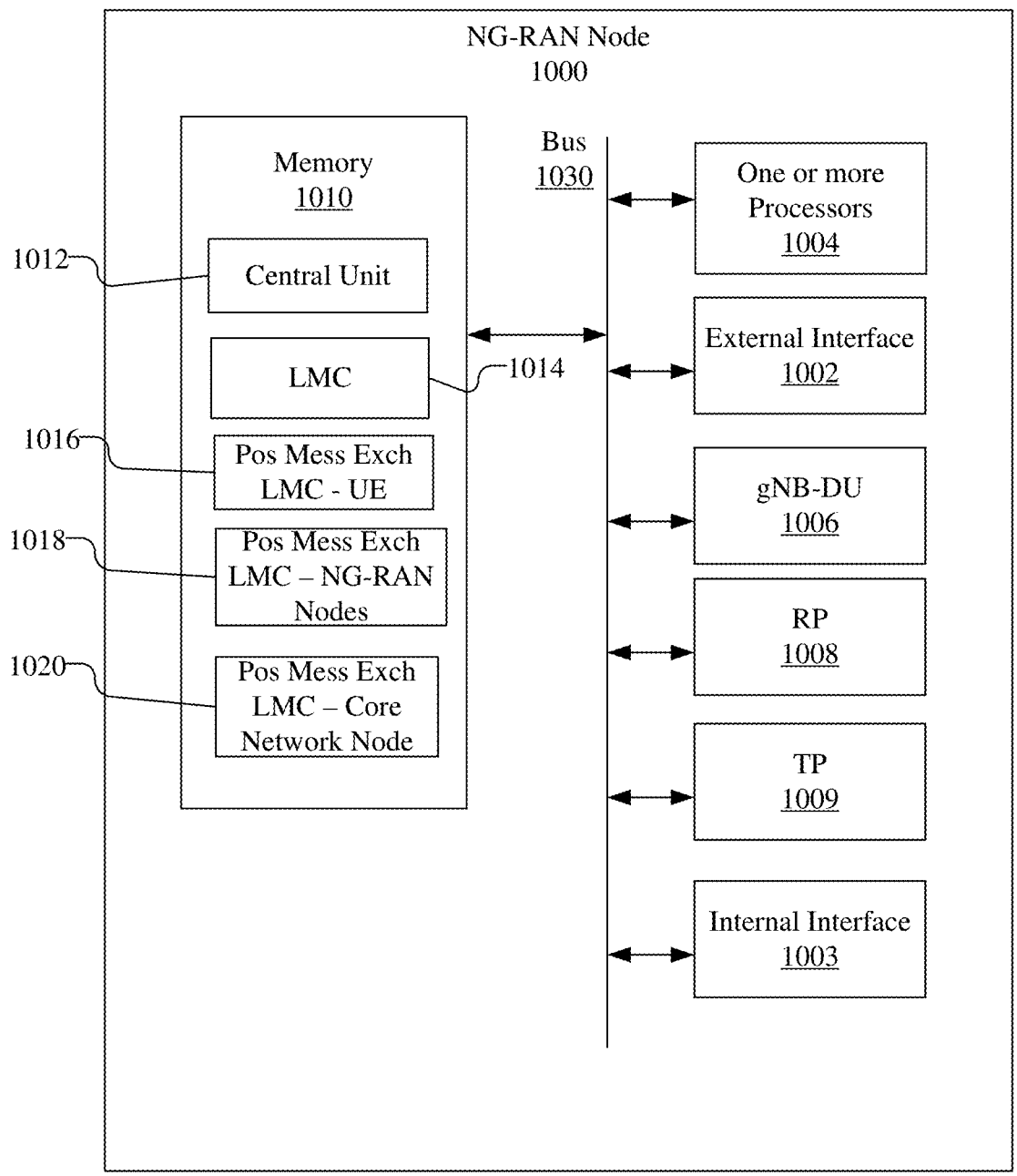
FIG. 10 is a diagram illustrating a hardware implementation of a NG-RAN node.

FIG. 10 is a diagram illustrating an example of a hardware implementation of a NG-RAN node 1000 in a wireless network, which may be, e.g., NG-RAN 300, NG-RAN 400, or a gNB 110, as discussed herein, and shown in FIGS. 1-7. The NG-RAN node 1000 may be performed by an entity at (or connected to) the serving base station or performed by the serving base station, and may be, e.g., part of a wireless network such as a 5G Core network (5GCN), e.g., 5GC 140. The NG-RAN node 1000 may include hardware components, e.g., such as an external interface 1002, which may be a wired or wireless interface capable of connecting to an AMF 115, base stations within the RAN, such as neighbor gNBs 110-2, 110-3, ng-eNB 114. The NG-RAN node 1000 may include an internal interface 1003, which may hardware or software interface capable of connecting internal entities within the NG-RAN node 1000. The NG-RAN node 1000 may optionally include hardware components, e.g., such as gNB-DU 1006, which may be similar to gNB-DU 304 or 306 and may be wirelessly connect to one or more UEs 102, as well as a Reception Point (RP) 1008, which may be similar to RP 113 and may wirelessly receive and measure signals transmitted by UEs 102, and a Transmission Point 1009, which may be similar to TP 111 and may wirelessly transmit signals to be measured by UEs 102. The NG-RAN node 1000 further includes one or more processors 1004 and memory 1010, which may be coupled together with bus 1030. The memory 1010 may store data and may contain executable code or software instructions that when executed by the one or more processors 1004 cause the one or more processors 1004 to operate as a special purpose computer programmed to perform the procedures and techniques disclosed herein (e.g. such as the process flow 700).

As illustrated in FIG. 10, the memory 1010 includes one or more components or modules that when implemented by the one or more processors 1004 implements the methodologies described herein. While the components or modules are illustrated as software in memory 1010 that is executable by the one or more processors 1004, it should be understood that the components or modules may be dedicated hardware either in the processors 1004 or off processor. As illustrated, the memory 1010 may include a Central Unit module 1012 that when implemented by the one or more processors 1004 configures the one or more processors 1004 to operate as a gNB-CU, such as gNB-CU 302, to communicate with one or more other NG-RAN nodes within the RAN and with a core network node, such as AMF 115, as shown FIGS. 3 and 4 and at stages 1, 1', 3, and 3' of FIG. 6B. The CU module 1012, for example, may configure the one or more processors 1004 to communicate with one or more other NG-RAN nodes via an Xn interface through the external interface 1002, and may communicate with a core network node via an NG interface through the external interface 1002.

The memory 1010 may further include a Location Management Component (LMC) module 1014 that when implemented by the one or more processors 1004 configures the one or more processors 1004 to operate as a LMC, such as LMC 117, to communicate with the CU module 1012 to support the positioning of the UE, and is further configured to communicate via the CU module 1012 with the UE 102, with the one or more other NG-RAN nodes and with the core network node to support the positioning of the UE, e.g., as shown in FIGS. 3 and 4, and stages 1', 2a, 2a', 2a", 2c, 2c', 2c", and 3 of FIG. 6B. The LMC module 1014, for example, may configure the one or more processors 1004 to communicate with the CU module 1012 via an F1 interface. The LMC module 1014 may configure the one or more processors 1004 to communicate with the one or more other NG-RAN nodes via the CU module 1012 using an Xn Application Protocol (XnAP) or a location specific protocol transported by XnAP, such as NR Positioning Protocol A (NRPPa).

In some implementations, the CU module 1012 and LMC module 1014 are physically separate, e.g., implemented in separate physical entities. In that case, a first physical entity may be as described for FIG. 10 but may include CU module 1012 and not LMC module 1014 and a second physical entity, connected to the first physical entity by internal interface 1003 using an F1 interface, may be as described for FIG. 10 but may exclude CU module 1012 but include LMC module 1014. In some implementations, the CU module 1012 and LMC module 1014 are physically combined, e.g., implemented in same the entity as shown in FIG. 10. In some implementations, CU module 1012 and/or LMC module 1014 may be separate hardware (HW) elements in NG-RAN node 1000 rather than software (SW) or firmware (FW) code in memory 1010. In some implementations, gNB-DU 1006, RP 1008 and/or TP 1009 may be supported at least partially by SW or FW code in memory 1010 running on processors 1004 rather than by separate HW elements as shown in FIG. 10. In some implementations, gNB-DU 1006, RP 1008 and/or TP 1009 may be physically separate from one another and/or from the rest of NG-RAN node 1000 (e.g. may be separated from one another by a distance of 100 meters up to 100 kilometers), and may include local memory, local processors and/or a local external (e.g. wireless and/or wireline) interface, and may be connected to CU module 1012 using a Local Area Network (LAN) or other type of communication link or signaling link rather than using a Bus 1030.

The LMC module 1014 may be configured to support the positioning of the UE by configuring the one or more processors 1004 to perform at least one of: requesting and receiving downlink (DL) location measurements from the UE; managing uplink (UL) location measurements by the NG-RAN node of the UE; sending assistance data to the UE; sending UL location measurements to the UE; managing static and dynamic scheduling of DL broadcast of reference signals by the NG-RAN node; managing static and dynamic scheduling of DL broadcast of assistance data by the NG-RAN node; interacting with the one or more other NG-RAN nodes to coordinate location support for the UE; determining a location estimate for the UE; providing a location service capability to the core network node; providing a location service capability to the one or more other NG-RAN nodes; or providing a location service capability to the UE.

The LMC module 1014 may configure the one or more processors 1004 to communicate with the one or more other NG-RAN nodes via the CU module 1012 by being configured to: send a request for uplink (UL) measurements for the UE to at least one of the one or more other NG-RAN nodes; send assistance data to assist the UL measurements for the UE to the at least one of the one or more other NG-RAN nodes; send a request for a change in downlink (DL) reference signal (RS) broadcast to at least one of the one or more other NG-RAN nodes; send a request for a change in broadcast of location assistance data to at least one of the one or more other NG-RAN nodes; or receive a location related message sent by the UE from one of the one or more other NG-RAN nodes.

The LMC module 1014 may configure the one or more processors 1004 to communicate with the core network node via the CU module 1012 using a Next Generation Application Protocol (NGAP) or a location related protocol transported by NGAP. The communication by the LMC with the core network node via the CU may include receiving an NGAP location reporting control message from the core network node; obtaining a location of the UE; and sending an NGAP location report to the core network node with the location of the UE.

The LMC module 1014 may configure the one or more processors 1004 to communicate with the UE via the CU module 1012 using a Radio Resource Control (RRC) protocol or a location specific protocol transported by RRC. For example, the location specific protocol may be a Long Term Evolution Positioning Protocol (LPP). The communication by the LMC module 1014 with the UE via the CU module 1012 may include at least one of: receiving a request for assistance data from the UE to assist location measurements by the UE; sending assistance data to the UE to assist location measurements by the UE; receiving a request from the UE for uplink (UL) location measurements of the UE; sending UL location measurements of the UE to the UE; receiving a request from the UE for broadcast of assistance data in System Information messages by the NG-RAN node; or receiving a request from the UE for a change in downlink (DL) reference signal (RS) broadcast by the NG-RAN node.

In an implementation in which the NG-RAN node 1000 includes TP 1009, the TP 1009 may be configured to transmit downlink (DL) reference signals (RSs) to be measured by the UE to support the positioning of the UE, wherein the CU module 1012 is configured to communicate with and control the TP 1009. In an implementation in which the NG-RAN node 1000 includes RP 1008, the RP 1008 may be configured to receive and measure uplink (UL) RSs transmitted by the UE to support the positioning of the UE, wherein the CU module 1012 is configured to communicate with and control the RP 1008. In an implementation in which the NG-RAN node 1000 includes gNB-DU 1006, the gNB-DU 1006 may be configured to transmit downlink (DL) reference signals (RSs) to be measured by the UE to support the positioning of the UE, or to receive and measure uplink (UL) RSs transmitted by the UE to support the positioning of the UE, wherein the CU module 1012 is configured to communicate with and control the gNB-DU 1006. For example, the CU module 1012 may be configured to communicate with the TP 1009 through an F1 interface, the CU module 1012 may be configured to communicate with the RP 1008 through an F1 interface, and the CU module 1012 may be configured to communicate with the gNB-DU 1006 through an F1 interface. The LMC module 1014 may be configured to communicate with the TP 1009 via the CU module 1012, the LMC module 1014 may be configured to communicate with the RP 1008 via the CU module 1012, and the LMC module 1014 may be configured to communicate with the gNB-DU 1006 via the CU module 1012.

As illustrated, the memory 1010 may further include a positioning messages exchange LMC-UE module 1016 that when implemented by the one or more processors 1004 configures the one or more processors 1004 to cause positioning messages to be exchanged between the LMC module 1014 and a UE, e.g., via the CU module 1012 and gNB-DU 1006. The positioning messages, for example, may be LPP or RRC messages. The positioning messages exchanged between the LMC module 1014 and the CU module 1012 may be inside an F1AP Transfer message. The positioning messages exchanged between the CU module 1012 and the gNB-DU 1006 may be inside an F1AP Transfer message. The positioning messages between the gNB-DU 1006 and the UE may be inside an RRC Transfer message. By way of example, the positioning messages exchanged between the LMC module 1014 and a UE may include at least one of: a request for assistance data received from the UE to assist location measurements by the UE; assistance data sent to the UE to assist location measurements by the UE; a request sent to the UE for transmission of an UL PRS by the UE; a request sent to the UE for measurement of a DL PRS by the UE; measurements of a DL PRS received from the UE; a request received from the UE for UL location measurements of the UE; UL location measurements of the UE sent to the UE; a request received from the UE for broadcast of assistance data in System Information messages by the NG-RAN node; a request received from the UE for a change in downlink (DL) positioning reference signal (PRS) broadcast by the NG-RAN node; or a combination thereof.

The memory 1010 may further include a positioning messages exchange LMC-NG-RAN Nodes module 1018 that when implemented by the one or more processors 1004 configures the one or more processors 1004 to cause positioning messages to be exchanged between the LMC module 1014 and one or more other NG-RAN nodes, e.g., gNBs, via the CU module 1012. The positioning messages, for example, may be positioning messages for NRPPa. The positioning messages exchanged between the LMC module 1014 and other NG-RAN nodes via the CU module 1012 may include positioning messages exchanged between the LMC module 1014 and the CU module 1012 inside an F1AP Transfer message. The positioning messages exchanged between the LMC module 1014 and other NG-RAN nodes via the CU module 1012 may include positioning messages exchanged between the CU module 1012 and the gNB-DU 1006 inside an F1AP Transfer message. The positioning messages exchanged between the LMC module 1014 and other NG-RAN nodes via the CU module 1012 may include positioning messages exchanged between the CU module 1012 and at least one of the one or more other NG-RAN nodes inside an XnAP Transfer message. By way of example, the positioning messages exchanged between the LMC module 1014 and the one or more other NG-RAN nodes may include at least one of: a request for UL measurements for the UE sent to at least one of the one or more other NG-RAN nodes; UL measurements for the UE received from at least one of the one or more other NG-RAN nodes; assistance data to assist UL measurements for the UE sent to at least one of the one or more other NG-RAN nodes; a request for a change in DL PRS broadcast sent to at least one of the one or more other NG-RAN nodes; a request for a change in broadcast of location assistance data sent to at least one of the one or more other NG-RAN nodes; or some combination thereof.

The memory 1010 may further include a positioning messages exchange LMC-Core Network Node module 1020 that when implemented by the one or more processors 1004 configures the one or more processors 1004 to cause positioning messages to be exchanged between the LMC module 1014 and the core network node, e.g., AMF 115, via the CU module 1012. The positioning messages, for example, may comprise messages for a service based protocol. The positioning messages exchanged between the LMC module 1014 and the core network node may include positioning messages exchanged between the LMC module 1014 and the CU module 1012 inside an F1AP Transfer message. The positioning messages exchanged between the LMC module 1014 and the core network node may include positioning messages exchanged between the CU module 1012 and the core network node inside an NGAP message.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1010) and executed by one or more processor units (e.g. processors 1004), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1010, and are configured to cause the one or more processors (e.g. processors 1004) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A Next Generation Radio Access Network (NG-RAN) node in a radio access network (RAN), may include a means for configuring a Central Unit (CU) to communicate with one or more other NG-RAN nodes within the RAN and with a core network node, which may be, e.g., the one or more processors 1004 with dedicated hardware or implementing executable code or software instructions in memory 1010 such as the Central Unit module 1012. A means for configuring a Location Management Component (LMC) to communicate with the CU to support the positioning of the UE, the LMC further configured to communicate via the CU with the UE, with the one or more other NG-RAN nodes and with the core network node to support the positioning of the UE may be, e.g., the one or more processors 1004 with dedicated hardware or implementing executable code or software instructions in memory 1010 such as the LMC module 1014.

In one implementation, the NG-RAN node includes at least one of a means for configuring the CU to communicate with and control a Transmission Point (TP) configured to transmit downlink (DL) reference signals (RSs) to be measured by the UE to support the positioning of the UE, which may be, e.g., the TP 1009 and one or more processors 1004 with dedicated hardware or implementing executable code or software instructions in memory 1010 such as the Central Unit module 1012; means for configuring the CU to communicate with and control a Reception Point (RP) configured to receive and measure uplink (UL) RSs transmitted by the UE to support the positioning of the UE which may be, e.g., the RP 1008 and one or more processors 1004 with dedicated hardware or implementing executable code or software instructions in memory 1010 such as the Central Unit module 1012; or means for configuring the CU to communicate with and control a gNB Distributed Unit (gNB-DU) configured to transmit downlink (DL) reference signals (RSs) to be measured by the UE to support the positioning of the UE, or to receive and measure uplink (UL) RSs transmitted by the UE to support the positioning of the UE which may be, e.g., the gNB-DU 1006 and one or more processors 1004 with dedicated hardware or implementing executable code or software instructions in memory 1010 such as the Central Unit module 1012.

An NG-RAN node in a radio access network (RAN) configured to support positioning of a UE, the NG-RAN node comprising a CU configured to communicate with one or more other NG-RAN nodes within the RAN and with a core network node, a LMC configured to communicate with the CU to support the positioning of the UE, and a DU configured to communicate with the UE, may include a means for exchanging a first plurality of positioning messages between the LMC and the UE via the CU and DU, which may be, e.g., the external interface 1002, the CU module 1012, the LMC module 1014, the gNB-DU 1006, the internal interface 1003, one or more processors 1004 with dedicated hardware or implementing executable code or software instructions in memory 1010 such as the positioning messages exchange LMC-UE module 1016. A means for exchanging a second plurality of positioning messages between the LMC and the one or more other NG-RAN nodes via the CU may be, e.g., the external interface 1002, the CU module 1012, the LMC module 1014, the gNB-DU 1006, the internal interface 1003, one or more processors 1004 with dedicated hardware or implementing executable code or software instructions in memory 1010 such as the positioning messages exchange LMC-NG-RAN Nodes module 1018. A means for exchanging a third plurality of positioning messages between the LMC and the core network node via the CU may be, e.g., the external interface 1002, the CU module 1012, the LMC module 1014, the internal interface 1003, one or more processors 1004 with dedicated hardware or implementing executable code or software instructions in memory 1010 such as the positioning messages exchange LMC-Core Network Node module 1020.

In one implementation, the means for exchanging the first plurality of positioning messages between the LMC and the UE via the CU and DU includes at least one of: means for exchanging each of the first plurality of positioning messages between the LMC and the CU inside an F1 Application Protocol (F1AP) Transfer message, which may be, e.g., the CU module 1012, the LMC module 1014, the internal interface 1003, one or more processors 1004 with dedicated hardware or implementing executable code or software instructions in memory 1010 such as the positioning messages exchange LMC-UE module 1016; means for exchanging each of the first plurality of positioning messages between the CU and the DU inside an F1AP Transfer message, which may be, e.g., the CU module 1012, the gNB-DU 1006, the internal interface 1003, one or more processors 1004 with dedicated hardware or implementing executable code or software instructions in memory 1010 such as the positioning messages exchange LMC-UE module 1016; means for exchanging at least one of the first plurality of positioning messages between the DU and the UE inside an RRC Transfer message, which may be, e.g., the external interface 1002, the gNB-DU 1006, one or more processors 1004 with dedicated hardware or implementing executable code or software instructions in memory 1010 such as the positioning messages exchange LMC-UE module 1016; or some combination of these.

In one implementation, the means for exchanging the second plurality of positioning messages between the LMC and the one or more other NG-RAN nodes via the CU includes at least one: means for exchanging each of the second plurality of positioning messages between the LMC and the CU inside an F1 Application Protocol (F1AP) Transfer message, which may be, e.g., the CU module 1012, the LMC module 1014, the internal interface 1003, one or more processors 1004 with dedicated hardware or implementing executable code or software instructions in memory 1010 such as the positioning messages exchange LMC-NG-RAN Nodes module 1018; means for exchanging at least one of the second plurality of positioning messages between the CU and the DU inside an F1AP Transfer message, which may be, e.g., the CU module 1012, the gNB-DU 1006, the internal interface 1003, one or more processors 1004 with dedicated hardware or implementing executable code or software instructions in memory 1010 such as the positioning messages exchange LMC-NG-RAN Nodes module 1018; means for exchanging at least one of the second plurality of positioning messages between the CU and at least one of the one or more other NG-RAN nodes inside an Xn Application Protocol (XnAP) Transfer message, which may be, e.g., the external interface 1002, the CU module 1012, one or more processors 1004 with dedicated hardware or implementing executable code or software instructions in memory 1010 such as the positioning messages exchange LMC-NG-RAN Nodes module 1018; or some combination of these.

In one implementation, the means for exchanging the third plurality of positioning messages between the LMC and the core network node includes at least one of: means for exchanging each of the third plurality of positioning messages between the LMC and the CU inside an F1 Application Protocol (F1AP) Transfer message, which may be, e.g., the CU module 1012, the LMC module 1014, the internal interface 1003, one or more processors 1004 with dedicated hardware or implementing executable code or software instructions in memory 1010 such as the positioning messages exchange LMC-Core Network Node module 1020; means for exchanging each of the third plurality of positioning messages between the CU and the core network node inside a Next Generation Application Protocol (NGAP) message, which may be, e.g., the external interface 1002, the CU module 1012, one or more processors 1004 with dedicated hardware or implementing executable code or software instructions in memory 1010 such as the positioning messages exchange LMC-Core Network Node module 1020; or some combination of these.

In one implementation, the means for exchanging the second plurality of positioning messages between the LMC and the one or more other NG-RAN nodes includes at least one of: means for sending a request for uplink (UL) measurements for the UE to at least one of the one or more other NG-RAN nodes; means for receiving uplink (UL) measurements for the UE from at least one of the one or more other NG-RAN nodes; means for sending assistance data to assist UL measurements for the UE to at least one of the one or more other NG-RAN nodes; means for sending a request for a change in downlink (DL) positioning reference signal (PRS) broadcast to at least one of the one or more other NG-RAN nodes; means for sending a request for a change in broadcast of location assistance data to at least one of the one or more other NG-RAN nodes; or some combination of these, which may be, e.g., the external interface 1002, the CU module 1012, the LMC module 1014, the gNB-DU 1006, the internal interface 1003, one or more processors 1004 with dedicated hardware or implementing executable code or software instructions in memory 1010 such as the positioning messages exchange LMC-NG-RAN Nodes module 1018.

In one implementation, the means for exchanging the first plurality of positioning messages between the LMC and the UE includes at least one: means for receiving a request for assistance data from the UE to assist location measurements by the UE; means for sending assistance data to the UE to assist location measurements by the UE; means for sending a request to the UE for transmission of an uplink positioning reference signal (UL PRS) by the UE; means for sending a request to the UE for measurement of a downlink positioning reference signal (DL PRS) by the UE; means for receiving measurements of a DL PRS from the UE; means for receiving a request from the UE for uplink (UL) location measurements of the UE; means for sending UL location measurements of the UE to the UE; means for receiving a request from the UE for broadcast of assistance data in System Information messages by the NG-RAN node; means for receiving a request from the UE for a change in downlink (DL) positioning reference signal (PRS) broadcast by the NG-RAN node; or some combination of these, which may be, e.g., the external interface 1002, the CU module 1012, the LMC module 1014, the gNB-DU 1006, the internal interface 1003, one or more processors 1004 with dedicated hardware or implementing executable code or software instructions in memory 1010 such as the positioning messages exchange LMC-UE module 1016.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for supporting positioning of a user equipment (UE) performed by a Next Generation Radio Access Network (NG-RAN) node in a radio access network (RAN), the NG-RAN node comprising a Central Unit (CU) configured to communicate with one or more other NG-RAN nodes within the RAN and with a core network node, a Location Management Component (LMC) configured to communicate with the CU to support the positioning of the UE, and a Distributed Unit (DU) configured to communicate with the UE, the method comprising:
   exchanging a first plurality of positioning messages between the LMC and the UE via the CU and DU;
   exchanging a second plurality of positioning messages between the LMC and the one or more other NG-RAN nodes via the CU; and
   exchanging a third plurality of positioning messages between the LMC and the core network node via the CU.

2. The method of claim 1, wherein the LMC is physically separate from the CU.

3. The method of claim 1, wherein the LMC and the CU are physically combined.

4. The method of claim 1, wherein the first plurality of positioning messages comprise messages for a Long Term Evolution (LTE) Positioning Protocol (LPP) or a Radio Resource Control (RRC) protocol.

5. The method of claim 4, wherein exchanging the first plurality of positioning messages between the LMC and the UE via the CU and DU includes at least one of:
   exchanging each of the first plurality of positioning messages between the LMC and the CU inside an F1 Application Protocol (F1AP) Transfer message;
   exchanging each of the first plurality of positioning messages between the CU and the DU inside an F1AP Transfer message;
   exchanging at least one of the first plurality of positioning messages between the DU and the UE inside an RRC Transfer message;
   or some combination of these.

6. The method of claim 1, wherein the second plurality of positioning messages comprise messages for a New Radio Positioning Protocol A (NRPPa).

7. The method of claim 6, wherein exchanging the second plurality of positioning messages between the LMC and the one or more other NG-RAN nodes via the CU includes at least one:
   exchanging each of the second plurality of positioning messages between the LMC and the CU inside an F1 Application Protocol (F1AP) Transfer message;
   exchanging at least one of the second plurality of positioning messages between the CU and the DU inside an F1AP Transfer message;
   exchanging at least one of the second plurality of positioning messages between the CU and at least one of the one or more other NG-RAN nodes inside an Xn Application Protocol (XnAP) Transfer message;
   or some combination of these.

8. The method of claim 1, wherein the third plurality of positioning messages comprise messages for a service based protocol.

9. The method of claim 8, wherein exchanging the third plurality of positioning messages between the LMC and the core network node includes at least one of:
   exchanging each of the third plurality of positioning messages between the LMC and the CU inside an F1 Application Protocol (F1AP) Transfer message;
   exchanging each of the third plurality of positioning messages between the CU and the core network node inside a Next Generation Application Protocol (NGAP) message;
   or some combination of these.

10. The method of claim 1, wherein the NG-RAN node comprises a New Radio (NR) Node B (gNB), the core network node comprises an Access and mobility Management Function (AMF), the CU comprises a gNB-CU, and the DU comprises a gNB-DU.

11. The method of claim 1, wherein exchanging the second plurality of positioning messages between the LMC and the one or more other NG-RAN nodes includes at least one of:
   sending a request for uplink (UL) measurements for the UE to at least one of the one or more other NG-RAN nodes;
   receiving uplink (UL) measurements for the UE from at least one of the one or more other NG-RAN nodes;
   sending assistance data to assist UL measurements for the UE to at least one of the one or more other NG-RAN nodes;
   sending a request for a change in downlink (DL) positioning reference signal (PRS) broadcast to at least one of the one or more other NG-RAN nodes;
   sending a request for a change in broadcast of location assistance data to at least one of the one or more other NG-RAN nodes; or
   some combination of these.

12. The method of claim 11, wherein exchanging the first plurality of positioning messages between the LMC and the UE includes at least one:
   receiving a request for assistance data from the UE to assist location measurements by the UE;
   sending assistance data to the UE to assist location measurements by the UE;
   sending a request to the UE for transmission of an uplink positioning reference signal (UL PRS) by the UE;
   sending a request to the UE for measurement of a downlink positioning reference signal (DL PRS) by the UE;

receiving measurements of a DL PRS from the UE;
receiving a request from the UE for uplink (UL) location measurements of the UE;
sending UL location measurements of the UE to the UE;
receiving a request from the UE for broadcast of assistance data in System Information messages by the NG-RAN node;
receiving a request from the UE for a change in downlink (DL) positioning reference signal (PRS) broadcast by the NG-RAN node; or
some combination of these.

13. The method of claim 1, wherein the CU is configured to communicate with the LMC through an F1 interface.

14. A Next Generation Radio Access Network (NG-RAN) node in a radio access network (RAN) configured to support positioning of a user equipment (UE), the NG-RAN node comprising a Central Unit (CU) configured to communicate with one or more other NG-RAN nodes within the RAN and with a core network node, a Location Management Component (LMC) configured to communicate with the CU to support the positioning of the UE, and a Distributed Unit (DU) configured to communicate with the UE, the NG-RAN node comprising:
at least one external interface configured to communicate with external entities;
at least one internal interface configured to communicate between the LMC, the CU, and the DU;
at least one memory;
at least one processor coupled to the at least one external interface, the at least one internal interface, and the at least one memory and configured to:
exchange a first plurality of positioning messages between the LMC and the UE via the CU and DU;
exchange a second plurality of positioning messages between the LMC and the one or more other NG-RAN nodes via the CU; and
exchange a third plurality of positioning messages between the LMC and the core network node via the CU.

15. The NG-RAN node of claim 14, wherein the LMC is physically separate from the CU.

16. The NG-RAN node of claim 14, wherein the LMC and the CU are physically combined.

17. The NG-RAN node of claim 14, wherein the first plurality of positioning messages comprise messages for a Long Term Evolution (LTE) Positioning Protocol (LPP) or a Radio Resource Control (RRC) protocol.

18. The NG-RAN node of claim 17, wherein the at least one processor is configured to exchange the first plurality of positioning messages between the LMC and the UE via the CU and DU by being configured to perform at least one of:
exchange each of the first plurality of positioning messages between the LMC and the CU inside an F1 Application Protocol (F1AP) Transfer message;
exchange each of the first plurality of positioning messages between the CU and the DU inside an F1AP Transfer message;
exchange at least one of the first plurality of positioning messages between the DU and the UE inside an RRC Transfer message;
or some combination of these.

19. The NG-RAN node of claim 14, wherein the second plurality of positioning messages comprise messages for a New Radio Positioning Protocol A (NRPPa).

20. The NG-RAN node of claim 19, wherein the at least one processor is configured to exchange the second plurality of positioning messages between the LMC and the one or more other NG-RAN nodes via the CU by being configured to perform at least one:
exchange each of the second plurality of positioning messages between the LMC and the CU inside an F1 Application Protocol (F1AP) Transfer message;
exchange at least one of the second plurality of positioning messages between the CU and the DU inside an F1AP Transfer message;
exchange at least one of the second plurality of positioning messages between the CU and at least one of the one or more other NG-RAN nodes inside an Xn Application Protocol (XnAP) Transfer message;
or some combination of these.

21. The NG-RAN node of claim 14, wherein the third plurality of positioning messages comprise messages for a service based protocol.

22. The NG-RAN node of claim 21, wherein the at least one processor is configured to exchange the third plurality of positioning messages between the LMC and the core network node by being configured to perform at least one of:
exchange each of the third plurality of positioning messages between the LMC and the CU inside an F1 Application Protocol (F1AP) Transfer message;
exchange each of the third plurality of positioning messages between the CU and the core network node inside a Next Generation Application Protocol (NGAP) message;
or some combination of these.

23. The NG-RAN node of claim 14, wherein the NG-RAN node comprises a New Radio (NR) Node B (gNB), the core network node comprises an Access and mobility Management Function (AMF), the CU comprises a gNB-CU, and the DU comprises a gNB-DU.

24. The NG-RAN node of claim 14, wherein the at least one processor is configured to exchange the second plurality of positioning messages between the LMC and the one or more other NG-RAN nodes by being configured to perform at least one of:
send a request for uplink (UL) measurements for the UE to at least one of the one or more other NG-RAN nodes;
receive uplink (UL) measurements for the UE from at least one of the one or more other NG-RAN nodes;
send assistance data to assist UL measurements for the UE to at least one of the one or more other NG-RAN nodes;
send a request for a change in downlink (DL) positioning reference signal (PRS) broadcast to at least one of the one or more other NG-RAN nodes;
send a request for a change in broadcast of location assistance data to at least one of the one or more other NG-RAN nodes; or
some combination of these.

25. The NG-RAN node of claim 24, wherein the at least one processor is configured to exchange the first plurality of positioning messages between the LMC and the UE by being configured to perform at least one:
receive a request for assistance data from the UE to assist location measurements by the UE;
send assistance data to the UE to assist location measurements by the UE;
send a request to the UE for transmission of an uplink positioning reference signal (UL PRS) by the UE;
send a request to the UE for measurement of a downlink positioning reference signal (DL PRS) by the UE;
receive measurements of a DL PRS from the UE;
receive a request from the UE for uplink (UL) location measurements of the UE;

send UL location measurements of the UE to the UE;

receive a request from the UE for broadcast of assistance data in System Information messages by the NG-RAN node;

receive a request from the UE for a change in downlink (DL) positioning reference signal (PRS) broadcast by the NG-RAN node; or some combination of these.

26. The NG-RAN node of claim 14, wherein the CU is configured to communicate with the LMC through an F1 interface.

27. A Next Generation Radio Access Network (NG-RAN) node in a radio access network (RAN) configured to support positioning of a user equipment (UE), the NG-RAN node comprising a Central Unit (CU) configured to communicate with one or more other NG-RAN nodes within the RAN and with a core network node, a Location Management Component (LMC) configured to communicate with the CU to support the positioning of the UE, and a Distributed Unit (DU) configured to communicate with the UE, the NG-RAN node comprising:

means for exchanging a first plurality of positioning messages between the LMC and the UE via the CU and DU;

means for exchanging a second plurality of positioning messages between the LMC and the one or more other NG-RAN nodes via the CU; and means for exchanging a third plurality of positioning messages between the LMC and the core network node via the CU.

28. The NG-RAN node of claim 27, wherein the NG-RAN node comprises a New Radio (NR) Node B (gNB), the core network node comprises an Access and mobility Management Function (AMF), the CU comprises a gNB-CU, and the DU comprises a gNB-DU.

29. A non-transitory storage medium including program code stored thereon, the program code is operable to cause at least one processor in a Next Generation Radio Access Network (NG-RAN) node in a radio access network (RAN) to support positioning of a user equipment (UE), the NG-RAN node comprising a Central Unit (CU) configured to communicate with one or more other NG-RAN nodes within the RAN and with a core network node, a Location Management Component (LMC) configured to communicate with the CU to support the positioning of the UE, and a Distributed Unit (DU) configured to communicate with the UE, the non-transitory storage medium comprising:

program code to exchange a first plurality of positioning messages between the LMC and the UE via the CU and DU;

program code to exchange a second plurality of positioning messages between the LMC and the one or more other NG-RAN nodes via the CU; and program code to exchange a third plurality of positioning messages between the LMC and the core network node via the CU.

30. The non-transitory storage medium of claim 29, wherein the NG-RAN node comprises a New Radio (NR) Node B (gNB), the core network node comprises an Access and mobility Management Function (AMF), the CU comprises a gNB-CU, and the DU comprises a gNB-DU.

* * * * *